(12) United States Patent
Sadeghi et al.

(10) Patent No.: US 12,294,885 B2
(45) Date of Patent: May 6, 2025

(54) METHODS AND PROCEDURES FOR CHANNEL MEASUREMENTS AND REPORTING MECHANISMS

(71) Applicant: InterDigital Patent Holdings, Inc., Wilmington, DE (US)

(72) Inventors: Pouriya Sadeghi, San Diego, CA (US); Janet A. Stern-Berkowitz, Little Neck, NY (US); Moon-il Lee, Melville, NY (US); J. Patrick Tooher, Montreal (CA); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/507,607

(22) Filed: Nov. 13, 2023

(65) Prior Publication Data

US 2024/0080701 A1    Mar. 7, 2024

Related U.S. Application Data

(63) Continuation of application No. 17/461,249, filed on Aug. 30, 2021, now Pat. No. 11,856,437, which is a
(Continued)

(51) Int. Cl.
*H04W 24/10* (2009.01)
*H04B 7/06* (2006.01)
(Continued)

(52) U.S. Cl.
CPC ....... *H04W 24/10* (2013.01); *H04W 72/0446* (2013.01); *H04B 7/0626* (2013.01);
(Continued)

(58) Field of Classification Search
CPC .. H04W 24/10; H04W 72/0446; H04L 5/001; H04L 5/0051
See application file for complete search history.

(56) References Cited

U.S. PATENT DOCUMENTS 9,319,918 B2    4/2016    Seo
9,331,826 B2    5/2016    Kim et al.
(Continued)

FOREIGN PATENT DOCUMENTS

CN    102217343 A    10/2011
CN    102624494 A    8/2012
(Continued)

OTHER PUBLICATIONS

Catt, "Discontinuous transmission on Scell for Laa", 3GPP TSG RAN WG1 Meeting #79, R1-144626, San Francisco, USA, Nov. 17-21, 2014.
(Continued)

*Primary Examiner* — Mohammad S Anwar
(74) *Attorney, Agent, or Firm* — Flaster Greenberg, P.C.

(57) ABSTRACT

A wireless transmit/receive unit (WTRU) may receive first measurement indication information indicating an activation of measurement reporting. The WTRU may determine a first set of resource elements (REs) based on the first measurement indication information. Further, the first set of REs may be associated with measurement-related time and frequency resources. Also, the WTRU may receive one or more measurement-related signals in the indicated first set of REs. Additionally, the WTRU may perform a measurement of each measurement-related signal. The WTRU may transmit, based on the first measurement indication information, a measurement report based on the measurement of each measurement-related signal. Further, the WTRU may receive second measurement indication information indicating a deactivation of measurement reporting. Also, the WTRU may receive indication information regarding a plurality of sets of REs via radio resource control (RRC) signaling, including at least the first set of REs and a second set of REs.

20 Claims, 7 Drawing Sheets

Related U.S. Application Data continuation of application No. 16/846,577, filed on Apr. 13, 2020, now Pat. No. 11,109,257, which is a continuation of application No. 15/526,667, filed as application No. PCT/US2015/060588 on Nov. 13, 2015, now Pat. No. 10,623,978.

(60) Provisional application No. 62/204,274, filed on Aug. 12, 2015, provisional application No. 62/080,004, filed on Nov. 14, 2014.

(51) Int. Cl.
| | |
|---|---|
| *H04L 5/00* | (2006.01) |
| *H04L 27/00* | (2006.01) |
| *H04W 16/14* | (2009.01) |
| *H04W 48/12* | (2009.01) |
| *H04W 72/0446* | (2023.01) |
| *H04W 88/06* | (2009.01) |

(52) U.S. Cl.
CPC ............ *H04L 5/001* (2013.01); *H04L 5/0051* (2013.01); *H04L 27/0006* (2013.01); *H04W 16/14* (2013.01); *H04W 48/12* (2013.01); *H04W 88/06* (2013.01)

(56) References Cited

U.S. PATENT DOCUMENTS

| | | | |
|---|---|---|---|
| 10,521,487 | B2 | 12/2019 | Zhou et al. |
| 2011/0249578 | A1 | 10/2011 | Nazar et al. |
| 2012/0176924 | A1 | 7/2012 | Wu et al. |
| 2012/0275398 | A1 | 11/2012 | Chen et al. |
| 2013/0208604 | A1 | 8/2013 | Lee et al. |
| 2013/0229931 | A1 | 9/2013 | Kim |
| 2013/0235756 | A1 | 9/2013 | Seo et al. |
| 2013/0301465 | A1* | 11/2013 | Seo ...................... H04B 17/345 370/252 |
| 2013/0322279 | A1 | 12/2013 | Chincholi et al. |
| 2014/0036796 | A1 | 2/2014 | Etemad et al. |
| 2014/0036881 | A1 | 2/2014 | Kim et al. |
| 2014/0056376 | A1 | 2/2014 | Guo et al. |
| 2014/0071931 | A1 | 3/2014 | Lee et al. |
| 2014/0112277 | A1 | 4/2014 | Yang et al. |
| 2014/0198678 | A1 | 7/2014 | Kim et al. |
| 2014/0247743 | A1 | 9/2014 | Seo |
| 2014/0302865 | A1 | 10/2014 | Bai et al. |
| 2015/0003356 | A1 | 1/2015 | Seo et al. |
| 2015/0045038 | A1 | 2/2015 | Gao et al. |
| 2015/0139113 | A1 | 5/2015 | You et al. |
| 2015/0223075 | A1 | 8/2015 | Bashar et al. |
| 2015/0244444 | A1 | 8/2015 | Mazzarese et al. |
| 2015/0358139 | A1 | 12/2015 | Li et al. |
| 2016/0029238 | A1 | 1/2016 | Chen et al. |
| 2016/0135148 | A1* | 5/2016 | Novlan ................ H04L 5/0032 370/329 |
| 2017/0111880 | A1* | 4/2017 | Park ...................... H04W 64/00 |

FOREIGN PATENT DOCUMENTS

| | | |
|---|---|---|
| CN | 102812658 A | 12/2012 |
| CN | 103392371 A | 11/2013 |
| CN | 103477579 A | 12/2013 |
| CN | 103733676 A | 4/2014 |
| CN | 104038312 A | 9/2014 |
| EP | 2 533 571 A1 | 12/2012 |
| EP | 2690816 A2 * | 1/2014 ........... H04L 5/0035 |
| EP | 2763338 A1 | 8/2014 |
| EP | 2919506 A1 | 9/2014 |
| JP | 2014033271 A | 2/2014 |
| KR | 20130036050 A | 4/2013 |
| KR | 20140029365 A | 3/2014 |
| KR | 20140090157 A | 7/2014 |
| WO | WO 2012/041422 A2 | 4/2012 |
| WO | WO 2012/096532 A2 | 7/2012 |
| WO | WO 2012/141513 A2 | 10/2012 |
| WO | WO 2012/148141 A2 | 11/2012 |
| WO | WO 2013/059999 A1 | 5/2013 |
| WO | WO 2013/072837 A1 | 5/2013 |
| WO | WO 2013/109036 A1 | 7/2013 |
| WO | WO 2013/169042 A1 | 11/2013 |
| WO | 2013177758 A1 | 12/2013 |
| WO | WO 2014/003432 A1 | 1/2014 |
| WO | 2014071638 A1 | 5/2014 |
| WO | WO 2014/165711 A1 | 10/2014 |
| WO | WO 2014/182541 A2 | 11/2014 |

OTHER PUBLICATIONS

Ericsson, "Further discussion on support of CSI Measurement and Reporting for LAA," 3GPP TSG RAN G1 Meeting #80bis, R1-152011, Belgrade, Serbia (Apr. 20-24, 2015).

Ericsson, "PHY-layer Options to Support CSI Measurement and Reporting for LAA," 3GPP TSG RAN WG1 Meeting #80, R1-150588, Athens, Greece (Feb. 9-13, 2015).

Interdigital Communications, "On L1 design for LTE LAA DL only mode," 3GPP TSG-RAN WG1#79, R1-145052, San Francisco, USA (Nov. 17-21, 2014).

LAN/MAN Standards Committee of the IEEE Computer Society, "IEEE Standard for Information technology—Telecommunications and information exchange between systems—Local and metropolitan area networks—Specific requirements. Part 11: Wireless LAN Medium Access Control (MAC) and Physical Layer (PHY) Specifications. Amendment 1: Radio Resource Measurement of Wireless LANs," IEEE Std. 802.11k-2008 (Jun. 12, 2008).

Third Generation Partnership Project, "Technical Specification Group Radio Access Network; Evolved Universal Terrestrial Radio Access (E-UTRA); Physical channels and modulation (Release 12)," 3GPP TS 36.211 V12.1.0 (Mar. 2014).

Third Generation Partnership Project, "Technical Specification Group Radio Access Network; Evolved Universal Terrestrial Radio Access (E-UTRA); Physical channels and modulation (Release 12)," 3GPP TS 36.211 V12.2.0 (Jun. 2014).

Third Generation Partnership Project, "Technical Specification Group Radio Access Network; Evolved Universal Terrestrial Radio Access (E-UTRA); Physical channels and modulation (Release 12)," 3GPP TS 36.211 V12.3.0 (Sep. 2014).

Third Generation Partnership Project, "Technical Specification Group Radio Access Network; Evolved Universal Terrestrial Radio Access (E-UTRA); Physical channels and modulation (Release 12)," 3GPP TS 36.211 V12.7.0 (Sep. 2015).

Third Generation Partnership Project, "Technical Specification Group Radio Access Network; Evolved Universal Terrestrial Radio Access (E-UTRA); Physical layer procedures (Release 12)," 3GPP TS 36.213 V12.1.0 (Mar. 2014).

Third Generation Partnership Project, "Technical Specification Group Radio Access Network; Evolved Universal Terrestrial Radio Access (E-UTRA); Physical layer procedures (Release 12)," 3GPP TS 36.213 V12.2.0 (Jun. 2014).

Third Generation Partnership Project, "Technical Specification Group Radio Access Network; Evolved Universal Terrestrial Radio Access (E-UTRA); Physical layer procedures (Release 12)," 3GPP TS 36.213 V12.3.0 (Sep. 2014).

Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.2.0 (Sep. 2014).

(56) References Cited

OTHER PUBLICATIONS

Third Generation Partnership Project, "Technical Specification Group Radio Access Network; Evolved Universal Terrestrial Radio Access (E-UTRA); Multiplexing and channel coding (Release 12)," 3GPP TS 36.212 V12.6.0 (Sep. 2015).
Third Generation Partnership Project, "Technical Specification Group Radio Access Network; Evolved Universal Terrestrial Radio Access (E-UTRA); LTE physical layer; General description (Release 12)," 3GPP TS 36.201 V12.0.0 (Sep. 2014).
Third Generation Partnership Project, "Technical Specification Group Radio Access Network; Evolved Universal Terrestrial Radio Access (E-UTRA); LTE physical layer; General description (Release 12)," 3GPP TS 36.201 V12.2.0 (Mar. 2015).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.3.0 (Sep. 2014).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).
Third Generation Partnership Project, "Technical Specification Group Radio Access Network; Evolved Universal Terrestrial Radio Access (E-UTRA); User Equipment (UE) radio transmission and reception (Release 12)," 3GPP TS 36.101 V12.5.0 (Sep. 2014).
Third Generation Partnership Project, "Technical Specification Group Radio Access Network; Evolved Universal Terrestrial Radio Access (E-UTRA); User Equipment (UE) radio transmission and reception (Release 12)," 3GPP TS 36.101 V12.9.0 (Oct. 2015).
Third Generation Partnership Project, "Technical Specification Group Radio Access Network; Evolved Universal Terrestrial Radio Access (E-UTRA); User Equipment (UE) radio transmission and reception (Release 13)," 3GPP TS 36.101 V13.1.0 (Oct. 2015).
Third Generation Partnership Project, "Technical Specification Group Radio Access Network; Evolved Universal Terrestrial Radio Access (E-UTRA); User Equipment (UE) radio access capabilities (Release 12)," 3GPP TS 36.306 V12.2.0 (Sep. 2014).
Third Generation Partnership Project, "Technical Specification Group Radio Access Network; Evolved Universal Terrestrial Radio Access (E-UTRA); User Equipment (UE) radio access capabilities (Release 12)," 3GPP TS 36.306 V12.6.0 (Sep. 2015).
Third Generation Partnership Project, "Technical Specification Group Radio Access Network; Evolved Universal Terrestrial Radio Access (E-UTRA); Base Station (BS) radio transmission and reception (Release 12)," 3GPP TS 36.104 V12.5.0 (Sep. 2014).
Third Generation Partnership Project, "Technical Specification Group Radio Access Network; Evolved Universal Terrestrial Radio Access (E-UTRA); Base Station (BS) radio transmission and reception (Release 12)," 3GPP TS 36.104 V12.9.0 (Sep. 2015).
Third Generation Partnership Project, "Technical Specification Group Radio Access Network; Evolved Universal Terrestrial Radio Access (E-UTRA); Base Station (BS) radio transmission and reception (Release 13)," 3GPP TS 36.104 V13.1.0 (Sep. 2015).
Third Generation Partnership Project, "Technical Specification Group Radio Access Network; Evolved Universal Terrestrial Radio Access (E-UTRA); Physical layer; Measurements (Release 12)," 3GPP TS 36.214 V12.0.0 (Sep. 2014).
Third Generation Partnership Project, "Technical Specification Group Radio Access Network; Evolved Universal Terrestrial Radio Access (E-UTRA); Physical layer; Measurements (Release 12)," 3GPP TS 36.214 V12.2.0 (Mar. 2015).
Third Generation Partnership Project, "Technical Specification Group Radio Access Network; Evolved Universal Terrestrial Radio Access (E-UTRA); Base Station (BS) and repeater ElectroMagnetic Compatibility (EMC) (Release 12)," 3GPP TS 36.113 V12.2.0 (Sep. 2014).
Third Generation Partnership Project, "Technical Specification Group Radio Access Network; Evolved Universal Terrestrial Radio Access (E-UTRA); Base Station (BS) and repeater ElectroMagnetic Compatibility (EMC) (Release 12)," 3GPP TS 36.113 V12.3.0 (Dec. 2014).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0 (Sep. 2014).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.7.0 (Sep. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.1.0 (Sep. 2015).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.3.0 (Sep. 2014).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.7.0 (Sep. 2015).
3rd Generation Partnership Project, "Discussion on Small Cell on/off Transition Time Reduction", New Postcom, R1-141370, 3GPP TSG RAN WG1 Meeting #76bis Shenzhen, China, Mar. 31-Apr. 4, 2014, 2 pages.
3rd Generation Partnership Project, "Status Report RAN WG1 to TSG-RAN #38", RP-070782, 3GPP TSG RAN #38 Cancun, Mexico, Nov. 27-30, 2007, 15 pages.
Third Generation Partnership Project (3GPP), "Left(/Right)most interfered PRB index as UE assistance information for LTE IDC", NEC, 3GPP TSG-RAN2 Meeting #79, R2-123687, Qingdao, China, Aug. 13-17, 2012, 3 pages.

* cited by examiner

METHODS AND PROCEDURES FOR CHANNEL MEASUREMENTS AND REPORTING MECHANISMS

CROSS REFERENCE TO RELATED APPLICATIONS

This application is a continuation of U.S. patent application Ser. No. 17/461,249, filed Aug. 30, 2021, which is a continuation of U.S. patent application Ser. No. 16/846,577, filed Apr. 13, 2020, which issued as U.S. Pat. No. 11,109,257 on Aug. 31, 2021, which is a continuation of U.S. patent application Ser. No. 15/526,667, filed May 12, 2017, which issued as U.S. Pat. No. 10,623,978 on Apr. 14, 2020, which is the U.S. National Stage, under 35 U.S.C. § 371, of International Application No. PCT/US2015/060588 filed Nov. 13, 2015, which claims the benefit of U.S. Provisional Application No. 62/080,004 filed Nov. 14, 2014 and U.S. Provisional Application No. 62/204,274 filed Aug. 12, 2015, the entire contents of which are hereby incorporated by reference herein.

BACKGROUND

Unlicensed spectrum which may have traditionally been used for non-cellular services and applications such as Wi-Fi, may be considered by cellular operators as a complementary tool to augment their service offerings to meet the increasingly high demand for broadband data.

SUMMARY

A method and apparatus for channel measurements and reporting mechanisms for Long Term Evolution (LTE) operation in an unlicensed band in a wireless transmit/receive unit (WTRU) are disclosed herein. The method includes that the WTRU may be in communication with a primary cell operating in a licensed band and a secondary cell operating in an unlicensed band. The WTRU may receive a request in a Downlink Control Information (DCI) signal for measurement and reporting, wherein the request may indicate at least one time/frequency resource in at least one subframe for performing a measurement in an unlicensed band. The WTRU may then perform the measurement according to the request. and send a measurement report based on the performed measurement.

In an example, the indicated at least one time/frequency resource may be a set of physical resource blocks (PRBs) or resource elements (REs). In another example, the indicated at least one time/frequency resource may correspond to a set of REs which may include REs used for one or more of a Channel-State-Information Reference Signal (CSI-RS), a CSI-Interference Measurement (IM), a zero-power CSI-RS or a Cell-specific Reference Signal (CRS).

In a further example, the at least one subframe for performing the measurement may be the subframe of the request or a window of subframes beginning with the subframe of the request. In yet another example, the measurement report may include an identification of a subframe or System Frame Number (SFN) associated with the measurement.

In still another example, the method includes receiving an indication from an evolved Node B (eNode-B), wherein the indication indicates time and frequency resources for performing measurements, performing measurements on the indicated time and frequency resources, and reporting the measurements to the eNode-B.

In an additional example, a WTRU may receive, from a base station, configuration information indicating a plurality of sets of REs. Each of the plurality of sets of REs may be associated with a CSI-RS configuration. Also, the WTRU may receive a request in a DCI signal, in a first time unit, to receive at least one CSI-RS, in at least one set of the plurality of sets of REs, in the first time unit, to perform a measurement and to report the measurement. Additionally, the request may indicate the at least one set of the plurality of sets of REs.

Further, the WTRU may receive the at least one CSI-RS, in the at least one set of the plurality of sets of REs, in the first time unit, according to the request. Moreover, the WTRU may perform the measurement of the at least one CSI-RS. Accordingly, the WTRU may transmit, to the base station, in at least one of the first time unit and a second time unit, a measurement report based on the performed measurement.

In another example, the measurement report may include an identification of the first time unit used to receive the at least one CSI-RS. Also, the measurement report may include an identification of an SFN.

In a further example, the first time unit may be a first subframe and the second time unit may be a second subframe. Moreover, the first subframe may include a first plurality of slots and the second subframe may include a second plurality of slots. Also, the first time unit may be a first slot and the second time unit may be a second slot.

In an additional example, a WTRU may receive first measurement indication information indicating an activation of measurement reporting. The WTRU may determine a first set of REs based on the first measurement indication information. Further, the first set of REs may be associated with measurement-related time and frequency resources. Also, the WTRU may receive one or more measurement-related signals in the indicated first set of REs. Additionally, the WTRU may perform a measurement of each measurement-related signal. Moreover, the WTRU may transmit, based on the first measurement indication information, a measurement report based on the measurement of each measurement-related signal. In addition, the WTRU may receive second measurement indication information indicating a deactivation of measurement reporting.

In another example, the WTRU may receive indication information regarding a plurality of sets of REs via radio resource control (RRC) signaling, including at least the first set of REs and a second set of REs. Further, the first set of REs may be selected from the plurality of sets of REs by an index received in the first measurement indication information. Also, the first measurement indication information may include an identification of uplink (UL) resources to use for the transmission of the measurement report.

In an additional example, the one or more measurement-related signals may include one or more CSI-RSs. Moreover, the one or more measurement-related signals may include one or more synchronization signals, wherein the one or more synchronization signals include one or more secondary synchronization signals (SSSs).

In a further example, the one or more measurement-related signals may be periodically received, the measurements of the one or more measurement-related signals are periodically performed and one or more measurement reports may be periodically transmitted, based on the first measurement indication information. Also, the first measurement indication information may be received in DCI and the second measurement indication information may be received in second DCI.

Moreover, the measurement report may include a Reference Signal Received Power (RSRP) measurement. In addition, the WTRU may receive indication information regarding a presence of at least one of the one or more measurement related signals in the first set of REs.

BRIEF DESCRIPTION OF THE DRAWINGS

A more detailed understanding may be had from the following description, given by way of example in conjunction with the accompanying drawings wherein.

DETAILED DESCRIPTION

Figure 1A:
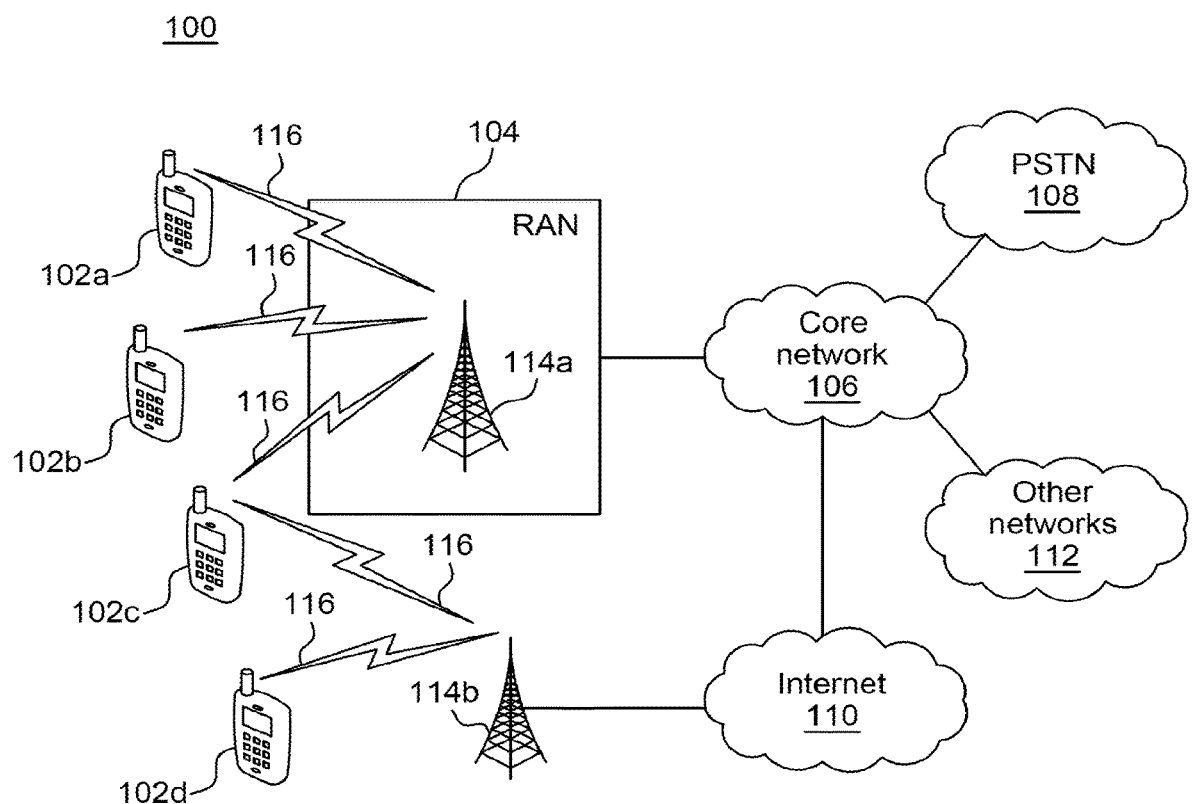
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (for example, radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
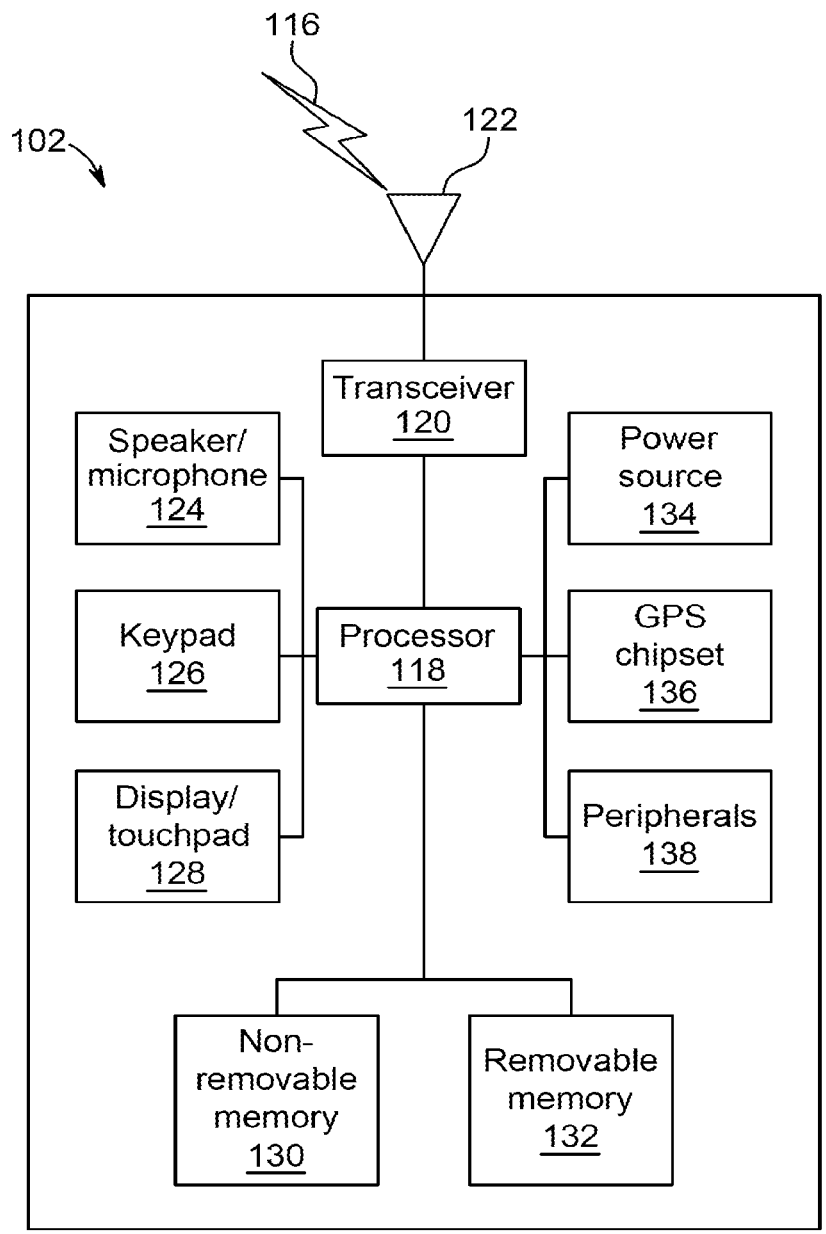
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
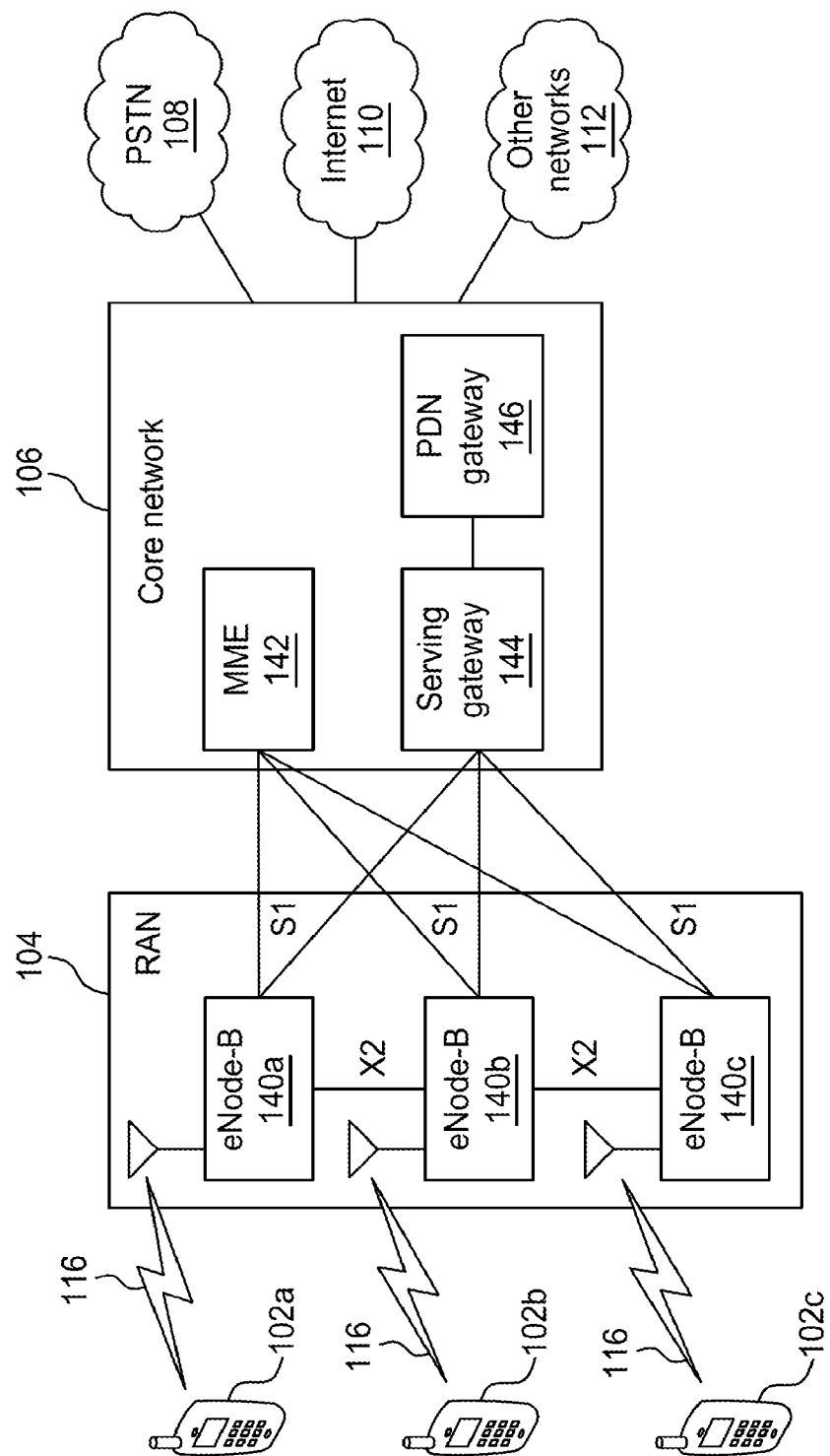
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (for example, an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Wireless communication systems compliant with Third Generation Partnership Project (3GPP) Long Term Evolution (LTE) may support up to 100 megabits per second (Mbps) in the downlink (DL), and up to 50 Mbps in the uplink (UL) for a 2×2 configuration. The LTE DL scheme may be based on an Orthogonal Frequency Division Multiple Access (OFDMA) air interface. Each radio frame may consist of ten subframes of 1 millisecond (ms) each. Each subframe may consist of two timeslots of 0.5 ms each. There may be either seven or six Orthogonal Frequency Division Multiplexing (OFDM) symbols per timeslot. Seven symbols per timeslot may be used with normal cyclic prefix (CP) length, and six symbols per timeslot may be used with extended CP length. The subcarrier spacing for a particular specification may be 15 kilohertz (kHz). A reduced subcarrier spacing mode using 7.5 kHz may also be possible. Frame and radio frame may be used interchangeably.

A resource element (RE) may correspond to one subcarrier during one OFDM symbol interval. Twelve consecutive subcarriers during a 0.5 ms timeslot may constitute one resource block (RB). With seven symbols per timeslot, each RB may consist of 12×7=84 REs.

The basic time-domain unit for dynamic scheduling may be one subframe consisting of two consecutive timeslots. This may sometimes be referred to as a RB pair. Certain subcarriers on some OFDM symbols may be allocated to carry pilot or reference signals in the time-frequency grid. A number of subcarriers at the edges of the transmission bandwidth may not be transmitted in order to comply with spectral mask requirements.

Uplink channels which may be provided, and/or used, include Physical UL Shared Channel (PUSCH) and/or Physical UL Control Channel (PUCCH). Control information, which may be referred to as UL Control Information (UCI), may be transmitted by a wireless transmit/receive unit (WTRU), for example in a subframe, on the PUSCH or the PUCCH, or part may be transmitted on the PUCCH and part on the PUSCH. UCI may include one or more of hybrid automatic repeat request (HARQ) acknowledgement (ACK)/negative acknowledgement (NACK), scheduling request (SR), and/or Channel State Information (CSI) which may include one or more of Channel Quality Indicator (CQI), Precoding Matrix Indicator (PMI), and Rank Indicator (RI). Resources which may be allocated for PUCCH transmission may be located at or near the edges of the UL band.

Downlink channels which may be provided, and/or used, include Physical Downlink Shared Channel (PDSCH) and/or downlink control channels which may include one or more of Physical Control Format Indicator Channel (PCFICH), Physical Hybrid-ARQ Indicator Channel (PHICH), Physical Downlink Control Channel (PDCCH), and/or Enhanced PDCCH (EPDCCH).

The first 1 to 3 OFDM symbol(s) in each subframe in the DL may be occupied by one or more of PCFICH, PHICH, and PDCCH according to the overhead of the control channels, and the symbols occupied may be referred to as the DL control region. The PCFICH may be transmitted in the $1^{st}$ OFDM symbol (for example, symbol 0) in each subframe and/or may indicate the number of OFDM symbols used for the DL control region in the subframe. A WTRU may detect a Control Format Indicator (CFI) from a PCFICH and the DL control region may be defined in the subframe according to the CFI value. The PCFICH may be skipped if a subframe may be defined as a non-PDSCH supportable subframe. DL symbols which are not part of a DL control region may be referred to as the data or PDSCH region. EPDCCH may be provided and/or used in the PDSCH region. The location of an EPDCCH in that region may be signaled, for example via higher layer signaling such as Radio Resource Control (RRC) signaling, to a WTRU that may (or may be expected to) monitor, receive or otherwise use that EPDCCH. The PDCCH and/or EPDCCH may provide control information, resource allocations (for example, grants) for UL and/or DL transmission, and the like.

DL signals and/or channels may be provided or transmitted by an eNode-B and/or may be received and/or used by a WTRU. UL signals and/or channels may be provided or transmitted by a WTRU and/or may be received and/or used by an eNode-B.

Signals and/or channels may be associated with a cell which may correspond to a certain carrier frequency and/or geographic area. A carrier frequency may be a center frequency of a cell (for example, the center frequency of a cell's supported bandwidth). An eNode-B may have one or more cells associated with it. eNode-B and cell may in some embodiments be used interchangeably.

Synchronization signals which may include a Primary Synchronization Signal (PSS) and/or a Secondary Synchronization Signal (SSS), may be provided or transmitted, for example by an eNode-B or cell. Such signals may be used by a WTRU to acquire time and/or frequency synchronization with an eNode-B or cell. The PSS and/or SSS may be present in subframes 0 and/or 5 and may be present in every radio frame. Transmission may be on 62 subcarriers at the center of a cell's bandwidth and 5 subcarriers on each side of the 62 may be reserved or unused. For frequency division duplex (FDD), PSS transmission may be in the last OFDM symbol and SSS in the $2^{nd}$ last (for example, next to last) OFDM symbol of timeslot 0 (for example, first timeslot of subframe 0) and timeslot 10 (for example, first timeslot of subframe 5) of each radio frame. For time division duplex (TDD), PSS transmission may be in the $3^{rd}$ OFDM symbol in subframes 1 and 6 and SSS may be transmitted in the last OFDM symbol in timeslot 1 (for example, the second timeslot of subframe 0) and timeslot 11 (for example, the second timeslot of subframe 5) of each radio frame. The synchronization signals may convey information regarding the physical cell identity (cell ID) of the cell.

A Physical Broadcast Channel (PBCH) which may be transmitted by an eNode-B, may carry important cell information such as a Master Information Block (MIB). The PBCH may be provided or transmitted in subframe 0 of each radio frame and may be repeated in each of four consecutive radio frames (for example, 40 ms time period). The PBCH may be transmitted in the first four OFDM symbols of the second timeslot of subframe 0 and may be transmitted on the 72 center subcarriers. The MIB may provide information such as the DL bandwidth of the cell, PHICH information, and at least part of the System Frame Number (SFN), for example the most significant 8 bits of a 10-bit SFN.

Downlink reference signals may include a Cell-specific Reference Signal (CRS) and/or a Channel-State-Information Reference Signal (CSI-RS), and/or a DeModulation Reference Signal (DM-RS), and/or a Positioning Reference Signal (PRS). DL reference signals may be received and/or used by a WTRU. CRS may be used by a WTRU for channel estimation for coherent demodulation of a (for example, any) downlink physical channel except certain DL channels which may include at least one of PMCH, EPDCCH, and PDSCH when configured with TM7, TM8, TM9, or TM10. The CRS may be used by a WTRU for channel state information measurements for the reporting of CQI, PMI, and/or RI, for example if the WTRU is configured with a transmission mode using CRS for PDSCH demodulation. The CRS may be used by a WTRU for cell-selection and/or mobility-related measurements. The CRS may be received in certain subframes such as any subframe and up to 4 antenna ports may be supported. DM-RS may be used by a WTRU for demodulation of certain channels which may include at least one of EPDCCH and PDSCH configured with TM7, TM8, TM9, or TM10. DM-RS which may be used for the demodulation of a certain channel (for example, EPDCCH or PDSCH) may be transmitted in the resource blocks assigned to the channel (for example, EPDCCH or PDSCH). CSI-RS, which may be transmitted with a duty cycle, may be used by a WTRU for channel state information measurements, for example if the WTRU may be configured with a transmission mode which may use DM-RS for PDSCH demodulation with the exception of certain transmission modes such as TM7 and/or TM8. The CSI-RS may also be used for cell-selection and mobility-related measurements, for example if a WTRU may be configured with a certain transmission mode (for example, TM10). The PRS may be used by a WTRU for position related measurements.

For LTE TDD, multiple TDD uplink and downlink subframe configurations may be supported and one of the configurations may be used in an eNode-B. Each TDD uplink and downlink subframe configuration may contain downlink subframe 'D', uplink subframe 'U', and special subframe 'S' as shown in Table 1.

Table 1 is an example of TDD LTE Uplink-downlink configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Conventional cellular systems, such as LTE systems, may use licensed spectrum. Operators may acquire, such as by auction from the government, the right to utilize a certain part of a frequency band in a certain area for transmission and reception of cellular signals. By using licensed spectrum, an operator may have exclusive use of that spectrum to provide services to its users, for example, without concern for in-band interference from the systems of other operators.

Unlicensed spectrum which may have traditionally been used for non-cellular services and applications such as Wi-Fi, may be considered by cellular operators as a complementary tool to augment their service offerings to meet the increasingly high demand for broadband data. One of the deployment scenarios to consider may employ carrier aggregation. In this scenario, which may be referred to as Licensed-Assisted Access (LAA), a (or the) primary component carrier (or serving cell) (PCell) may be a licensed carrier (for example, a carrier which may use licensed spectrum). An unlicensed carrier (for example, a carrier which may use unlicensed spectrum) may be a secondary component carrier (or serving cell) (SCell) which may be aggregated with the PCell.

Figure 2:
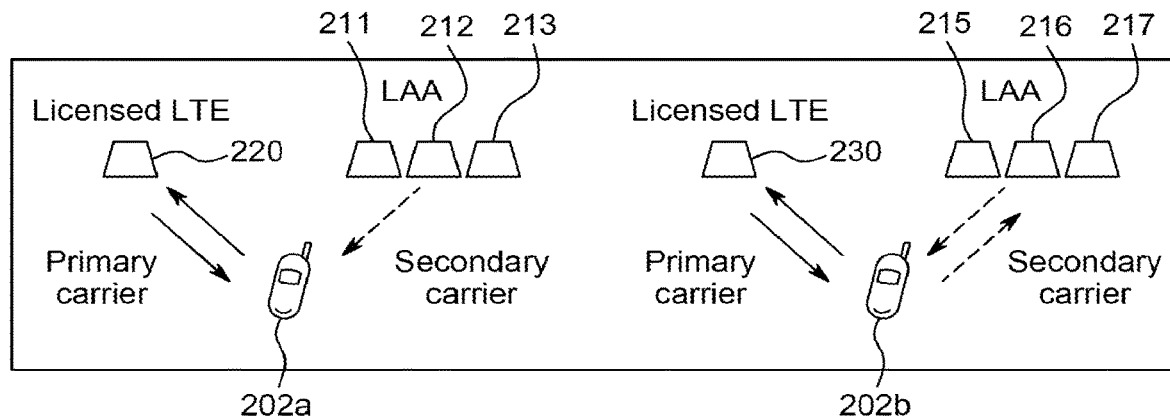
FIG. 2 is a system diagram of an example Licensed-Assisted Access (LAA) scenario.

FIG. 2 is a system diagram of an example LAA scenario. In an example, there may be one or more unlicensed SCells and zero, one or more licensed SCells which may be aggregated together and/or with the PCell. The PCell may be a licensed LTE PCell. In an example shown in scenario 200, WTRU 202a may use SCells or secondary carriers 211, 212, 213, and PCell or primary carrier 220. WTRU 202b may use SCells or secondary carriers 215, 216, 217, and PCell or primary carrier 230. With carrier aggregation, the PCell and SCells may belong to the same eNode-B. In another deployment scenario, dual connectivity may be employed where one or more unlicensed carriers may belong to a different eNode-B than the licensed PCell.

When considering LTE operation in unlicensed spectrum, coexistence of LTE with other unlicensed technologies such as Wi-Fi, as well as among LTE operators, may be considered in order to, for example, attempt to minimize interference and provide for fairness among the users of the spectrum. Mechanisms such as Listen-Before-Talk (LBT) and transmission gaps may be used. With LBT, a system node such as an Access Point (AP), eNodeB (eNode-B), wireless transmit/receive unit (WTRU), and the like, may listen to a channel (for example, a frequency band with a certain center frequency and bandwidth) to determine if there may be another user using the channel before transmitting on the channel or a portion of the channel.

Figure 3:
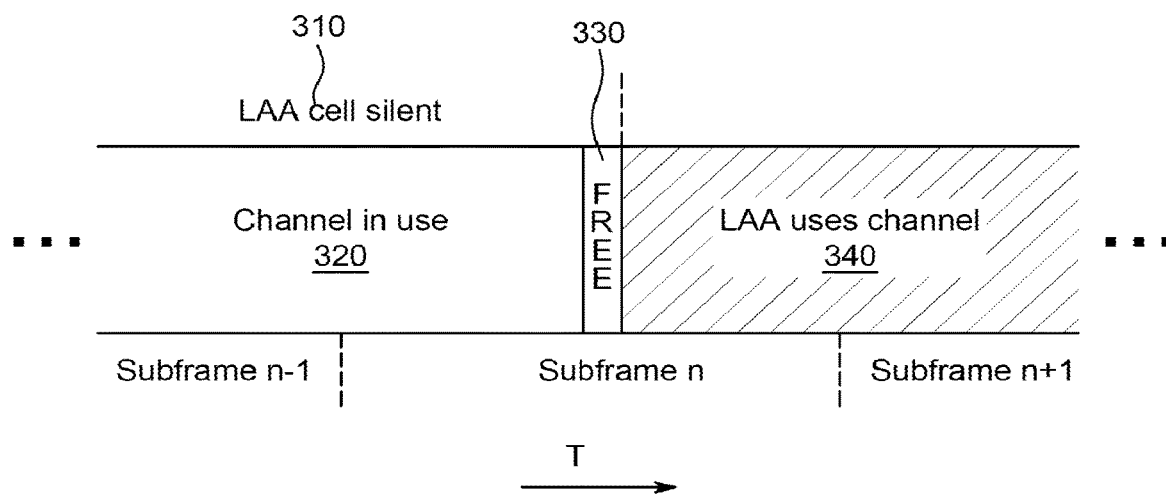
FIG. 3 is a system diagram of an example LAA system using Listen-Before-Talk (LBT)

FIG. 3 is a system diagram of an example LAA system using LBT. In an example, listening and/or determination of usage by another may include or be based on measurements which may include energy detection. With transmission gaps, a system node which may transmit on a channel or part of a channel may include or ensure there are gaps in its transmission, for example, to allow other potential users to see the channel as free and/or use the channel. In an example, the other potential users may not use the channel if they detect energy above a threshold. In an example shown in system 300, the LAA cell user may be silent while another user uses the channel 320. The LAA cell user may then detect a free period 330. The LAA cell user may then use the channel 340. Further, hidden nodes may cause interference which an LAA cell may not detect.

LTE operation in an unlicensed spectrum, which may or may not be combined with operation in a licensed spectrum (for example, which may be with or without aggregation or dual connectivity with a licensed PCell), may be referred to as LTE-Unlicensed operation or LTE-U. The terms Wi-Fi, WiFi, and Wifi may be used interchangeably herein.

Use of coexistence mechanisms such as LBT and transmission gaps may result in transmission and/or reception issues and/or new scenarios for LTE-U which may need to be addressed. These issues and/or scenarios may be due to the existence of gaps themselves. For example, the existing measurement and reporting mechanisms in LTE which may use or be based on signals which may be regularly available, may not be applicable and/or optimized for LTE-U operation which may involve gaps in the transmission of some signals.

In some embodiments described herein, the terms eNode-B and cell may be used interchangeably. In some embodiments, the terms unlicensed and license-exempt (LE) may be used interchangeably. In some embodiments operate may be used interchangeably with transmit and/or receive. In some embodiments the terms component carrier may be used interchangeably with serving cell.

An LTE-U eNode-B may be an eNode-B or cell which may transmit and/or receive one or more LTE channels (for example, physical channels) and/or signals and/or may operate, for example, transmit and/or receive signals, in a license-exempt (LE) band. The LTE-U eNode-B may transmit and/or receive one or more LTE channels and/or signals in a licensed band and/or in a LE band. In the LE band in which an LTE-U eNode-B may operate, one or more other radio access technologies (RATs) such as Wi-Fi, one or more other LTE-U eNode-Bs, and/or one or more WTRUs may exist and/or operate. In some embodiments, the terms eNode-B and LTE-U eNode-B, may be used interchangeably. In some embodiments WTRU may be substituted for eNode-B and/or vice versa and still be consistent with this disclosure. In some embodiments UL may be substituted for DL and/or vice versa and still be consistent with this disclosure. The terms LTE-U and LAA may be used in place of each other and still be consistent with this disclosure.

In some embodiments, a channel may refer to a frequency band which may have a center or carrier frequency and a bandwidth. Licensed and/or unlicensed spectrum may include one or more channels which may or may not overlap. The terms channel, frequency channel, wireless channel, and LE channel may be used interchangeably. Accessing a channel may be the same as using (for example, transmitting and/or receiving on or using) the channel.

In some embodiments, a channel may refer to an LTE channel or signal such as an uplink or downlink physical channel or signal. Downlink channels and signals may include one or more of PSS, SSS, PBCH, PDCCH, EPDCCH, and PDSCH. Uplink channels and signals may include one or more of PRACH, PUCCH, SRS, and PUSCH. Channel and LTE channel may be used interchangeably. Channels and signals may be used interchangeably.

In some embodiments data/control may mean data and/or control signals and/or channels. Control may include synchronization. The data/control may be LTE data/control. The terms data/control and data/control channels and/or signals may be used interchangeably. Channels and signals may be used interchangeably. LTE and LTE-A may be used interchangeably.

In some embodiments channel resources may be resources (for example, 3GPP LTE or LTE-A resources) such as time and/or frequency resources which may, for example, at least sometimes, carry one or more channels and/or signals. In some embodiments, channel resources may be used interchangeably with channels and/or signals.

Reference signal, CSI-RS, CRS, DM-RS, DRS, measurement reference signal, reference resource for measurement, CSI-Interference Measurement (IM), and measurement RS may be used interchangeably. SCell, secondary cell, LTE-U cell, license-assisted cell, unlicensed cell, and LAA cell may be used interchangeably. PCell, primary cell, LTE cell, and licensed cell may be used interchangeably. Interference and interference plus noise may be used interchangeably.

Methods and apparatuses using LTE-U, LTE unlicensed band, LAA, a busy signal and/or a synchronization signal are disclosed herein. Methods and apparatuses are disclosed herein for measurement handling for LTE cells in an unlicensed band when the signals and resources to be measured may not be regularly available. A dynamic indication (e.g., including start and duration) of signal and resource presence may indicate availability for measurements, e.g., PSS/SSS, CRS, CSI-RS as well as CSI-IM which may be used for interference measurements. Dynamic requests for measurements and measurement reports may indicate the presence/non-presence of signals and/or resources for measurements, e.g., Reference Signal Received Power (RSRP), Reference Signal Received Quality (RSRQ), CSI, Received Signal Strength Indicator (RSSI), and/or interference (e.g., using CSI-IM).

Methods and apparatuses are disclosed herein for a dynamic change of signal and resource location to reduce interference and enable LAA resource sharing among LAA cells. Methods and apparatuses are disclosed herein for hidden node measurement and reporting. Interference measurements may be triggered and/or reported with a timestamp/time window to enable an eNode-B to correlate with the eNode-B's own measurements and detect hidden nodes. During transmission, interference measurements on resources (e.g., CSI-IM) may be dynamically requested (e.g., in a DL grant).

Methods and apparatuses are disclosed herein for CSI reporting optimization. On demand resource identification and report timing to enable CSI reporting in the active time of the LAA cell. Methods and apparatuses are disclosed herein for new measurement types, which may include but are not limited to the following example types: enhanced RSSI (eRSSI), interference, SINR and/or radar detection. Methods and apparatuses are disclosed herein for opportunistic measurement and reporting. Methods and apparatuses are disclosed herein for a dynamic indication of measurement reporting.

A WTRU may, or may need to, measure a signal or channel or one or more characteristics (for example, power, signal-to-interference plus noise ratio (SINR), signal-to-noise ratio (SNR), and the like) of a signal or channel when the presence or availability of the signal or channel may not be regular (for example, periodic) or may not be according to a known or configured schedule. For example in an LTE cell, reference signals (such as CRSs) may be present in all DL subframes, while in a cell which may turn off the transmission of reference signals, such as an LTE-U or LAA cell, such reference signals may (or may only) be available sometimes or in some DL subframes and may not be available at other times, for example during off periods, LBT, or transmission gaps. Measurement accuracy and/or system performance may be impacted if a WTRU may not know when signals which it may or may need to measure may or may not be present.

In a one example, a WTRU may receive an indication, for example, from an eNode-B or cell, which may inform the WTRU when one or more signals and/or channels which may be used (for example, by the WTRU) for measurements may be present or not present (for example, transmitted or not transmitted by the eNode-B or cell or another eNode-B or cell). The indication may be provided dynamically, for example, via physical layer signaling such as in a Downlink Control Information (DCI) format. The indication may include the resources on which the one or more signals and/or channels may be present or not present which may include time and/or frequency resources. These resources may be referred to as channel resources. The indication may include a request to perform and/or report at least one measurement, for example using the indicated one or more signals and/or channels and/or channel resources. The indication may be referred to as a signal-presence indication or measurement-indication and the terms may be used interchangeably. The indication may or may not include identification (for example, explicit identification) of one or more signals and/or channels which may be used for measurements.

In some examples, the indication may include channel resources which may be used for measurements and may or may not include information regarding or identifying the signals and/or channels which may be related to the measurements. The channel resources may be used (for example, by the WTRU) for measuring one or more signals and/or channels which may be from (or transmitted by) an eNode-B or cell such as a serving eNode-B or cell of the WTRU. The channel resources may be used (for example, by the WTRU) for one or more measurements (for example, for measuring interference) in the absence of some or all signals and/or channels which may be from (or transmitted by) an eNode-B or cell such as a serving eNode-B or cell of the WTRU.

In another example, a WTRU may receive an indication, for example, from an eNode-B, which may inform the WTRU on which time and/or frequency resources (for example, channel resources) the WTRU may perform a measurement. The indication may be provided dynamically, for example, via physical layer signaling such as in a DCI format. The indication may include a request to perform and/or report at least one measurement, for example, using the indicated channel resources. The channel resources may be used (for example, by the WTRU) for measuring one or more signals and/or channels which may be from (or transmitted by) an eNode-B or cell such as a serving eNode-B or cell of the WTRU. The channel resources may be used (for example, by the WTRU) for one or more measurements (for example, for measuring interference) in the absence of some or all signals and/or channels which may be from (or transmitted by) an eNode-B or cell such as a serving eNode-B or cell of the WTRU.

A signal and/or channel which may be used for measurements may be called a measurement-related signal. A measurement-related signal may be or may include one or more (for example, a combination) of: a synchronization signal, a reference signal, PSS, SSS, CRS, CSI-RS, DM-RS (or DMRS), and/or PRS. Channel resources which may be used for measurements may be called measurement-related channel resources. Measurement-related channel resources may be, or include, channel resources which may carry at least one measurement-related signal. Measurement-related channel resources may be or include channel resources which may be used for measurements and which may not contain a signal and/or channel (for example, for or from a certain eNode-B or cell such as a serving eNode-B or cell of the WTRU). Measurement-related channel resources may be or may include one or more of CSI-RS and/or CSI-IM channel resources. CSI-RS may be or include zero-power CSI-RS.

For example, a WTRU may perform measurements on zero-power CSI-RS and/or CSI-IM channel resources, for example to measure or determine the presence of interference.

Measurement-related signals and measurement-related channel resources may be used interchangeably. The WTRU may make a measurement, which may be in response to a measurement request, using the indicated signal and/or channel, and/or channel resources. The WTRU may report the measurement in response to a request and/or in response to a measurement trigger. Dynamic and/or on-demand signal indications, channel resource indications, and/or measurement requests may enable measurements to be more optimal for LTE-U.

In an example, an LTE-U cell may wait to use an unlicensed frequency channel until it may detect the channel as free and/or may have a short time during which it may keep (for example, use or continue to use) an unlicensed frequency channel (for example, 4-12 ms). The time during which an LTE-U cell may use (or transmit on) a frequency channel may be called the active time of the cell. The cell may or may only transmit signals (which may include measurement-related signals) during its active time. Preconfigured measurement periods may not align well with the active time. The LTE-U cell (or its associated eNode-B) may use (for example, transmit to a WTRU) one or more measurement indications, which may be dynamic or on-demand, to enable and/or request measurements which may align (for example, better align) with at least part of the active time.

In another example, an LTE-U cell (or its associated eNode-B) may change the resources on which the cell may transmit a channel and/or signal, for example dynamically or from one active time to another active time. The eNode-B or cell may change the resources to adapt its (or the cell's) transmissions to the presence of interference and/or to enable multiple LTE-U cells to share a frequency channel. The eNode-B or cell may include channel resources in a measurement indication that may enable one or more measurements to account for these changes.

In another example, an LTE-U cell (or its associated eNode-B) may change the resources on which the cell may not transmit (or may transmit with zero power) a channel and/or signal, for example dynamically or from one active time to another active time. The eNode-B or cell may change the resources to enable measurements of interference to be, for example, dynamically, targeted in time and/or frequency and/or to enable interference measurements to be made on some resources while the cell may transmit on other resources. The eNode-B or cell may include channel resources in a measurement indication that may enable one or more measurements to account for these changes.

Not transmit and transmit with zero power may be used interchangeable. A signal which may be not present or absent may be a signal which may be transmitted at zero power and vice versa.

A channel resource or channel resources may be indicated in time and/or frequency domains. A time domain indication may include or indicate one or more of: one or a number of subframes, one or a number of timeslots, one or a number of OFDM symbols, one or a number of time samples, and/or one or a number of frames, among others. The time units (for example, subframes, frames, symbols, and the like) may be LTE time units.

A frequency domain indication may include or indicate one or more of: a carrier frequency (for example, which may be represented by an E-UTRA Absolute Radio Frequency Channel Number (EARFCN)), a bandwidth, one or more subcarriers, and/or a set or sets of subcarriers (for example, a set of 12 subcarriers which may correspond to an RB or RB pair), among others. A frequency domain indication may (or may be used to) include or indicate one or more RBs (or RB pairs). This may apply when the time domain (for example, one or more timeslots or subframes) for the one or more RBs (or RB pairs) may be known or understood (for example, by the WTRU).

A resource element (RE) may correspond to one subcarrier during one OFDM symbol interval. A RE may be an example of a channel resource which may be indicated and/or defined and/or identified in both time and frequency domains. An RB or physical RB (PRB) may indicate and/or define and/or identify a set of channel resources in both time and frequency domains or in frequency domain (for example, only).

RB and PRB may be used interchangeably. RB (or PRB) may be used to represent a certain number of subcarriers such as 12 subcarriers. An RB (or PRB) may correspond to one timeslot. The term RB (or PRB) may be used to represent an RB (or PRB) pair which may correspond to 2 timeslots, for example of a subframe. The set of subcarriers which may correspond to each RB in an RB pair may be the same, for example, if there may be no frequency hopping, or different, for example, if there may be frequency hopping.

A channel resource may be indicated or identified by one or more of: one or a number of RBs, a set or sets of RBs, one or a number of REs, and/or a set or sets of REs.

A WTRU may receive a measurement indication and/or an eNode-B may transmit a measurement indication. The WTRU may receive the measurement indication from the eNode-B. A measurement indication may include an indication of one or more channel resources that may contain or carry a measurement-related signal. For example, the measurement indication may include or identify a set of PRBs and/or REs which may carry (or not carry) a measurement-related signal (and/or other signal or signals) such as CRS or CSI-RS, which may be presented in that set of PRBs and/or REs according to rules which may be the rules of licensed LTE. The time location, for example, in a subframe, may be known or determined without explicit indication.

In an example, a bit map may be used to indicate the PRB(s). A certain value, for example 1, may correspond to signal presence and another for example, 0, may correspond to absence of the signal. In another example, the indication may include one or more of a starting PRB, a center PRB, a number of PRBs, and/or a bandwidth.

A measurement indication may include an indication of one or more channel resources which may not contain or carry one or more (for example, any) measurement-related signals (or one or more or any other signals) and may be used for interference measurements.

Whether a channel resource may carry a measurement-related signal or another signal may correspond to whether one or more of the following may transmit a measurement-related signal or other signal in the channel resource: the eNode-B or cell which may transmit the measurement indication, a serving eNode-B of the WTRU, a serving cell of the WTRU, an LTE-U cell, and/or an LTE-U cell, for example, of the WTRU and/or a serving eNode-B of the WTRU which may be configured and/or activated.

A measurement indication may correspond to one or more measurement-related signals and/or measurement types, for example, CRS measurement, CSI-RS measurement, PSS and/or SSS measurement, one or more of RSRP, RSRQ, RSSI measurement, CSI-IM measurement, and the like. The measurement indication may include the signal or signals and/or the type or types explicitly, for example by a value or values which may be configured by the eNode-B to correspond to one or more signals and/or measurement types. The signal or signals and/or type or types may be indicated implicitly, for example, by the DCI format of the measurement indication or the RNTI used to scramble the CRC of the DCI format. The WTRU may receive different measurement indications for different measurement-related signals and/or measurement types.

Based on at least a measurement indication which may indicate the presence or absence of a measurement-related signal and/or a measurement type, the WTRU may expect the indicated signal (or the signal or signals related to the measurement type) to be present or absent on the channel resources (for example, in time and/or frequency) indicated. The WTRU may determine the time and/or frequency resources on which a signal may or may not be present using (or also using) other information such as configuration received from the eNode-B, a priori known time and/or frequency locations, and the like.

A WTRU may perform a measurement on channel resources which may be determined as function of a measurement indication and/or one or more other indications, definitions, or rules. For example, the WTRU may perform the measurement on the channel resources which may be determined from a combination of a measurement indication and definitions or rules of the licensed LTE. In an example, the frequency resources (for example, RBs) for a signal may be included in the measurement indication while the time resources (for example, symbols in a subframe) may be the same as defined for LTE. In another example, the time resources (for example, symbols in a subframe) for a signal may be included in the measurement indication while the frequency resources (for example, RBs) may be the same as defined for LTE.

The time period for or during which a WTRU may perform a measurement (for example, a certain measurement) may be referred to as a "measurement period" and may be expressed in milliseconds (ms or msec), frames, subframes, timeslots, OFDM symbols, time samples, and the like. "Measurement indication" and "measurement period indication" may be used interchangeably.

A measurement indication and/or time domain indication may include an indication of a measurement period and/or an indication of one or more parameters of a measurement period which may include at least one of a start time, an end time, a length of time, and a pattern of time. A measurement indication may include or identify the start of a measurement period. The measurement indication may include or identify one or more of the first frame, first subframe, first timeslot, first OFDM-symbol, and/or first time sample of the measurement period. The WTRU may receive a measurement period start indication implicitly and/or explicitly.

In an example, the WTRU may receive a measurement indication in subframe n. The measurement indication may be provided and/or received in a DCI signal or format. The measurement indication and/or receipt of the measurement indication in subframe n may indicate that the measurement period may start in subframe n+x. The value of x may be dynamic, for example, indicated in the same DCI, and/or configured, for example, by signaling such as higher layer (for example, RRC) signaling from the eNode-B. The value of x may be a fixed or known value such as 0, 1, 2, 3, or 4. For TDD, the value of x may be a function of the TDD UL/DL configuration of the LAA cell. The value of x may be 0 which may indicate the measurement period may start in the same subframes as the one in which the measurement indication may be received. The value of x may not be included in the DCI.

In another example, the WTRU may use the start of the active time of an LAA cell for the start of the measurement period. The start of the active time may be indicated explicitly such as by a DCI format from the eNode-B or may be blindly determined by the WTRU, for example, based on detection of one or more signals such as one or more of PSS, SSS, CRS, busy signal, and the like.

A measurement indication may include or identify the end of a measurement period. The measurement indication may include or identify the last subframe and/or timeslot and/or OFDM-symbol and/or time sample of the measurement period. A WTRU may receive a measurement period end indication implicitly and/or explicitly.

In an example, the WTRU receive a measurement indication in subframe n. The measurement indication may be provided and/or received in a DCI signal or format. The measurement indication and/or receipt of the measurement indication in subframe n may indicate that the measurement period may end in subframe n+x. The value of x may be a dynamic, for example, indicated in the same DCI, and/or configured, for example, by signaling such as higher layer (for example, RRC) signaling from the eNode-B. The value of x may be a fixed or known value such as 0 which may indicate the measurement period may end in subframe n+0 (for example, the subframe in which the measurement indication may be received). The value of x may not be included in the DCI.

In another example, the WTRU may use the end of the active time for an LAA cell for the end of the measurement period. The end of the active time may be indicated by the eNode-B, for example by a DCI format. The end of the active time may be determined by the WTRU from one or more indications, for example, which may be provided by the eNode-B, such as the start of the active time, active time duration, amount of time left to the end of active time, a time such as the first time the WTRU may be scheduled with resources on the LAA cell. One or more of the indications may be provided and/or received in physical layer signaling such as a DCI format. The end of the active time may be determined by the WTRU based on the absence of one or more signals or the measurement of one or more signals below a threshold. The one or more signals may include one or more of the measurement-related signals such as PSS, SSS, and CRS.

A measurement indication may include or identify the length of the measurement period. The length may be expressed in one or more of a number of frames, subframes, timeslots, OFDM symbols, time samples, and the like. A WTRU may use the indications of a measurement period length and a measurement period start to calculate or determine the end of the measurement period. A WTRU may use the indications of a measurement period length and a measurement period end to calculate or determine the start of the measurement period. For example, a WTRU may receive an indication of a measurement period length of y in subframe n. If the start of the period may be in subframe n+x, then the WTRU may determine the end of the period to be in subframe n+x+y.

Following the start of a measurement period and/or during (or during the length of) a measurement period for a certain measurement, a WTRU may begin making the measurements or may continue to make the measurements. The WTRU may combine the new measurements of a certain type with previous (for example, stored) values of the same type, for example the WTRU may use the new measurements in a filtered or averaged version of the measurement. The WTRU may make the measurement on the channel resources which may be indicated, for example, by at least a measurement indication.

Upon the end of a measurement period or the end of the duration of a measurement period for a certain measurement, the WTRU may stop making the measurements. For a type of measurement, the WTRU may store a number of the measurements (for example, measurement samples) and/or a representative value (for example, a filtered or averaged value) which the WTRU may use, for example when the measurement may be activated again at a later time. The WTRU may report a value for or related to the measurement to the eNode-B.

A measurement indication may include or identify a pattern of time units or time periods for the measurement period. The pattern may be referred to as a measurement pattern. The measurement pattern may include or identify a pattern of subframes and/or timeslots and/or OFDM symbols and/or time samples which may constitute, comprise, or be included in the measurement period. A measurement-related signal which may be indicated to be present or measured during a measurement period with a time unit pattern (for example, a subframe pattern), may or may only be present (for example, transmitted by the eNode-B) in the time units (for example, the subframes) which may be indicated by the pattern. The measurement related signal may not be present (for example, not transmitted by the eNode-B) in other time units (for example, subframes).

Absence of one or more signals (for example, all signals) may be indicated by a measurement pattern. The measurement pattern may indicate a time unit pattern during which the one or more (for example, all) signals may not be present (for example, may not be transmitted by the eNode-B).

For a measurement-related signal with a time unit (for example, subframe) pattern, the WTRU may (or may only) consider or use for measurement purposes channel resources (for example, indicated or configured channel resources) which may be located in the time units (for example, subframes) indicated in the time unit (for example, subframe) pattern. For example, the WTRU may receive a bit map, for example, "0101010101" which may correspond to the subframes in a radio frame. The bit map may indicate in which subframes one or more measurement-related signals may be present (or absent), for example, present in the second, forth, sixth, eight and tenth subframes of the radio frame. The WTRU may (or may only) perform measurements on the channel resources of the one or more measurement-related signals in the indicated subframes (for example, subframes indicated as present or absent which may depend on the measurement type).

In another example, the pattern may be relative to the start of the measurement period, for example, every nth subframe beginning with subframe n+k where n may be the subframe in which the measurement indication or measurement pattern may be received and k may be greater than or equal to 0. A measurement pattern may identify specific time units (for example, subframes) in which a signal or signals may be present or absent. The pattern may determine the measurement period. For example the duration of the pattern may be the duration of the measurement period. A measurement pattern may be (or may be assumed to be) repeated within the measurement period. The measurement-related signal may be present (or absent) and/or measured (for example, by the WTRU) in time units (for example, subframes) of the pattern which may fall within the measurement period. The measurement pattern may be (or may be assumed to be) the same in one or more (for example, all) frames within (for example, at least partially within) the measurement period. The measurement-related signal may be present (or absent) and/or measured (for example, by the WTRU) in time units (for example, subframes) of the pattern which may fall within the measurement period.

Different LTE-U eNode-Bs and/or cells may have or use different measurement patterns. For example, two or more LTE-U cells may be deployed on the same frequency channel and/or may be active at the same time. One or more of their measurement periods may overlap in time. If their measurement patterns do not overlap, each LTE-U cell may transmit its measurement-related signals according to its measurement pattern and may not interfere with the measurement-related signals of another LTE-U cell.

A measurement indication may include or identify an indication of one or more cells (for example, LTE-U cells) and/or one or more frequency channels (for example, LTE-U frequency channels, which may or may not correspond to an active LTE-U cell) for which the measurement indication may apply. The measurement indication may include or identify one or more cell IDs or a range of cell IDs. The measurement indication may include or identify one or more frequency channels (for example, by index which may correspond to a configured list of LTE-U frequency channels).

A WTRU may receive a measurement indication for one or more LTE-U cells. The WTRU may receive different measurement indications for different LTE-U cells.

A measurement indication or another means or indication may (or may include an indication to) activate (or enable or start) and/or deactivate (or disable or stop) one or more measurement procedures and/or mechanisms. A measurement indication may include an indication to start or stop making one or more measurements which may be configured by physical layer and/or higher layer signaling such as RRC signaling. An indication of the start of active time for an LAA cell may enable measurements related to the LAA cell. An indication of the end of active time for an LAA cell or the completion of the duration (for example, an indicated duration) of the active time of the cell may disable measurements related to the LAA cell and/or enable measurements related to one or more other cells and/or users (or potential users) of a channel.

In an example, a WTRU may receive an indication, for example, from the eNode-B, which may activate a set of measurements and/or measurement procedures and/or mechanisms which may (or may only) apply for an LAA cell or during active time for an LAA cell. Measurement configurations may be provided, for example, by the eNode-B, separately and/or with the indication. The indication may be the start of the active time for the LAA cell which may be explicitly indicated (for example, by physical layer signaling) or blindly detected by the WTRU. The indication may be or may be included in or with a measurement indication.

A WTRU may receive an indication, for example, from the eNode-B, which may deactivate a set of measurements and/or measurement procedures and/or mechanisms which may (or may only) apply for an LAA cell or during active time for an LAA cell. The indication may be the end of the active time for the LAA cell or the start of the inactive time for the LAA cell. The indication of the end of active time may be replaced by completion of the duration of the active time.

A WTRU may receive an indication, for example, from the eNode-B, which may activate a set of measurements and/or measurement procedures and/or mechanisms which may be apply during (or only during) inactive time for an LAA cell, such as those related to measuring other LAA cells and/or WiFi users which may be deployed on the same channel. The indication may be the end of the active time for the LAA cell or the start of the inactive time for the LAA cell. The indication of the end of active time may be replaced by completion of the duration of the active time. The indication may be or may be included in or with a measurement indication.

Following receipt of an indication to activate (or start or enable) certain measurements, the WTRU may begin making the measurements or may continue to make the measurements. The WTRU may combine the new measurements of a certain type with previous (for example, stored) values of the same type, for example the WTRU may use the new measurements in a filtered or averaged version of the measurement. The WTRU may make the measurement on the channel resources which may be indicated, for example, by at least a measurement indication.

Upon receipt of an indication to deactivate (or stop or disable) certain measurements, the WTRU may stop making the measurements. For a type of measurement, the WTRU may store a number of the measurements (for example, measurement samples) and/or a representative value (for example, a filtered or averaged value) which the WTRU may use, for example when the measurement may be activated again at a later time. The WTRU may report a value for or related to the measurement to the eNode-B.

A measurement indication may be provided in physical layer signaling such as in a DCI signal or format. An eNode-B may transmit the measurement indication and/or a WTRU may receive (for example, from the eNode-B) the indication. A measurement indication and/or the RNTI which may be used to scramble the CRC format of the DCI format may be at least one of cell-specific, WTRU-specific, or specific to a group of WTRUs. A measurement indication may be provided to or intended for a group of WTRUs, for example by using a group RNTI. One or more WTRUs which may be configured with that group RNTI may receive the same measurement indication. A measurement indication may be provided via resources (for example, PDCCH or EPDCCH) on a cell in licensed spectrum such as the PCell or another cell. A measurement indication may be provided via resources (for example, PDCCH or EPDCCH) on a cell in unlicensed spectrum such as the LAA cell to which the measurement indication may apply or another cell. A measurement indication may be included in signaling (for example, a DCI format) which may be separate or different from one or more other signaling (for example, DCI formats) such as signaling (for example, DCI formats) which may be defined or available for LTE of a certain release such as Release 12. A measurement indication may be included in signaling (for example, a DCI format) for which the purpose or intent may or may only be to provide a measurement indication. A measurement indication may be included in signaling (for example, a DCI format) which may have at least one purpose or intent which may be separate or different from a measurement indication. For example, a measurement indication may be included with a DL grant, for example, for resources on an LAA cell or channel.

The eNode-B may transmit and/or the WTRU may receive (for example, from the eNode-B) configuration information which may be relates to LAA measurements. The configuration information may be provided in higher layer signaling such as RRC signaling. The configuration information may include parameters and/or sets of parameters which may be referenced by index or other identity, for example in a measurement indication. For example, one or more sets of channel resources may be identified for one or more measurement-related signals and/or measurement types. To identify the channel resources for a measurement-related signal and/or measurement type, an index or identity which may correspond to the desired channel resources may be used in the measurement indication.

In another example, one or more measurement patterns may be identified for one or more measurement-related signals and/or measurement types. To identify a measurement pattern for a measurement-related signal and/or measurement type, an index or identity which may correspond to the desired measurement pattern may be used in the measurement indication.

Whether a measurement indication may be cell-specific, WTRU-specific, and/or group-WTRU specific may be specific to or determined by the eNode-B or cell which may provide the indication.

Whether a measurement indication may be cell-specific, WTRU-specific, and/or group-WTRU specific may be specific to or determined by the cell or frequency channel for which the indication may be provided.

A measurement indication which may be cell-specific may have an RNTI associated with it which may be known and/or used by some (for example, all WTRUs) in the cell. The measurement indication may (or may also) be provided to a WTRU or group of WTRUs in dedicated or group signaling (for example, using an RNTI such as a C-RNTI which may or may only be known to the WTRU or a group RNTI which may or may only be known to the group of WTRUs).

A measurement indication may be or include a measurement request. A measurement request may be or include a measurement indication. Embodiments which may apply to a measurement request may be applied to a measurement indication and vice versa and still be consistent with this disclosure. Measurement request and measurement indication may be used interchangeably.

A measurement indication may request one or more measurements be performed for example on one or more of the resources which may be indicated with the request. A measurement indication may request an on-demand or aperiodic measurement which may be performed, for example using indicated channel resources and/or over at least part of an indicated or otherwise known or determined measurement period.

A measurement request may be explicit (for example, a bit included in a measurement indication or other signaling or indication). A measurement request may be implicit, for example a measurement indication for a measurement-related signal may imply a request for the related measurement.

An eNode-B may provide the measurement indication or request to one or more WTRUs. A WTRU which may receive the indication or request may perform the measurement, for example using indicated channel resources and/or over at least part of an indicated or otherwise known or determined measurement period. For example, an eNode-B may provide or use a measurement indication to a WTRU to indicate that a signal or signals (for example, CRS) may be present in a measurement period of subframes. The eNode-B may indicate the starting subframe or the starting subframe may be the subframe in which the eNode-B may provide the indication. The eNode-B may indicate a duration of subframes during which the signal or signals may be present. For example, if the eNode-B may have taken or may expect to transmit one or more signals or channels (which may include the indicated signal or signals such as CRS) for at least N (for example, the next N) subframes, the eNode-B may indicate a measurement period of N subframes.

The eNode-B may request the WTRU to perform and/or the WTRU may perform a measurement such as an RSRP measurement during at least part of the measurement period. The WTRU may combine measurements it may make during the measurement period with each other and/or with previous measurements to determine a filtered, averaged, or otherwise combined measurement which the WTRU may report and/or use for reporting decisions.

A measurement request may be for a current LAA cell or channel or a different LAA cell or channel. A current LAA cell may be one which may be configured as a serving cell and/or activated, for example, for the WTRU to which the request may be made. A current LAA channel may be the frequency channel of a current LAA cell. A measurement request may include one or more indications or parameters of a frequency channel on which a WTRU may make one or more measurements such as the requested or enabled measurement. The indications and/or parameters may include one or more of a carrier or center frequency (for example, which may be represented by EARFCN), a bandwidth, and/or an identity or index of a frequency channel which may be included in a configuration (for example, a configured list) of frequency channels. The configuration may identify the carrier frequency and/or bandwidth and/or other parameters of the channel.

Measurement may be used to represent a single or specific measurement and/or the combination of one or more measurements of the same or different types. The combination may result in a single value which may be reported. The measurement indication or other request or indication may provide resources such as UL resources (for example, on the PCell, the LAA cell for the requested or indicated measurement or measurements-related signal or signals, or a another cell) on which the WTRU may report the requested or indicated measurement or other value which may be related to or determined from the requested or indicated measurement or measurement related signal or signals.

The eNode-B may request the WTRU to report the measurement and/or the WTRU may report the measurement using UL resources (for example, PUCCH and/or PUSCH resources) which the eNode-B may provide with the measurement indication or request. The WTRU may report the measurement when UL resources may be provided (for example, at a later time) for that or another purpose.

UL resources which may be provided and/or used for a measurement report such as an LAA measurement report may be resources (for example, PUCCH and/or PUSCH) on a cell in licensed spectrum such as the PCell or another cell. UL resources which may be provided and/or used for a measurement report such as an LAA measurement report may be resources (for example, PUCCH and/or PUSCH) on a cell in unlicensed spectrum such as the LAA cell to which the measurement indication, request, or report may apply or another cell.

The WTRU may report the measurement according to a schedule which may be configured and/or based on a triggering event such as the measurement crossing a threshold or the change of the measurement crossing a threshold.

Figure 4:
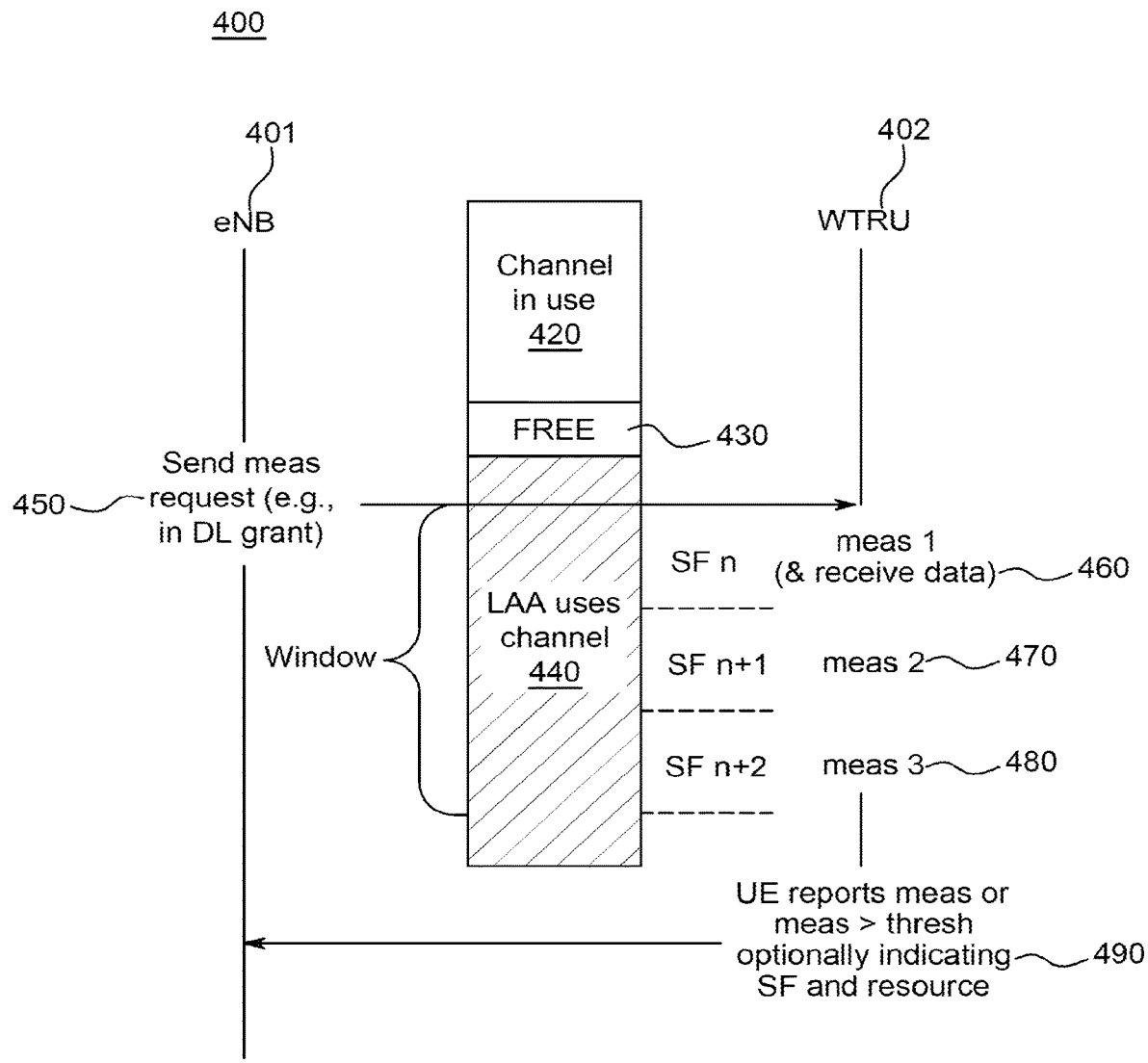
FIG. 4 is a signaling diagram of an example method for channel measurement and reporting mechanisms for Long Term Evolution (LTE) operation in an unlicensed band.

FIG. 4 is a signaling diagram of an example method for channel measurement and reporting mechanisms for Long Term Evolution (LTE) operation in an unlicensed band. The WTRU may take or make one or more measurements. Further, the WTRU may report the measurements or may report the measurements if they exceed (or satisfy) a threshold, or report the fact that the measurements exceed (or satisfy) a threshold. The WTRU may receive a dynamic signal and/or interference measurement request from an eNode-B and may report the use of an LAA (or unlicensed band) cell back to the eNode-B. In an example shown in signaling diagram 400, an eNode-B 401 and a WTRU 402 may share use of an LAA channel with another user of the LAA channel. The channel may initially be in used 420 by the other user and then enter a free period 430. After the free period, the eNode-B 401 and the WTRU 402 may begin to use the channel 440. The eNode-B 401 and the WTRU 402 may be part of an LAA cell. In an example, the LAA cell may indicate the subframe (or window of possible subframes) and/or time/frequency resources to be used by the WTRU to take or make the measurements. For example, the eNode-B 401 may send a measurement request 450 to the WTRU 402 for the WTRU 402 to take or make measurements. In an example, the measurement request 450 may be included in a downlink grant from the eNode-B 401 to the WTRU 402. The measurement request may include an indication of the time and/or time/frequency resources to measure reference signals or interference in the unlicensed band. The resources may correspond to CSI-RS, zero power (ZPR) CSI-RS, CSI-IM, RE set, subcarrier set and/or others.

In an example, the WTRU 402 may receive data and take a first measurement in a subframe (SF) n 460. The WTRU 402 may also take a second measurement in SF n+1 and a third measurement in SF n+2. The WTRU 402 may then report the measurements 490 back to the eNode-B 401.

In an example, in addition to the measurement, the report 490 transmitted by the WTRU 402 may also indicate a time indication and/or the subframe (or window of subframes) and/or resources associated with the measurement (for example, when the measurement occurred and/or exceeded the threshold). The time indication may at least one of: a time stamp (absolute or relative to the request), a time window (for example, a start and stop time), or the amount of time (for example, the number of SFs, time resources or symbols).

In an example, a WTRU may transmit a measurement report, for example to an eNode-B or cell. A measurement report may include one or more of the following: the measurement value or a representative value for the measurement; an indication of the time (for example, a timestamp or time window) and/or the amount of time at or during which a measurement or other value was evaluated; an indication of the time (for example, a timestamp or time window) and/or the amount of time at or during which a measurement or other value met or exceeded a certain criteria; an indication of the time at which a measurement evaluation started; cell ID (for example, of a LAA cell) which may correspond to the measurement; frequency or frequency channel information (for example, carrier frequency) of the channel to which the measurement may correspond; and channel resources (in time and/or frequency) on which the measurement may have been made and/or to which the report may correspond.

An indication of time may be absolute such as an SFN, or relative such as an offset in time (for example, in subframes) from a start time which may be the subframe in which a measurement indication may have been transmitted or received. An indication of time and/or amount of time may be a time window such as a measurement period. The time window may have a start time and/or a duration. One or more of the start time and/or duration may be known and may not need to be included in the report. For example, the start time may be the subframe n in which the measurement request may have been transmitted and/or received or a subframe offset k (for example, k=4) from that subframe n. An indication of time and/or amount of time may be a number of time periods (for example, a number of symbols or subframes). An indication of the time and/or the amount of time at during which a measurement or other value met or exceeded a certain criteria may be a number of time periods or may be a ratio or percent of time with respect to a time during which a measurement or other value may have been evaluated.

In an example, an evaluation time window may be N time periods (for example, subframes) and a measurement may have met a criteria (for example, above or below a threshold) K times (for example, in K subframes) in the N time periods. One or more of N, K, and K/N may be reported.

Actual values, quantized values, indices representing the values or quantized values, indices to sets of configurations, or other representations of the values to be reported may be used and still be consistent with this disclosure. A measurement or representative value may correspond to a maximum value, an averaged value, and/or a filtered value (for example, by higher layers).

An indication of time and/or amount of time in the report may assist an eNode-B in determining the presence of hidden nodes. For example, if a WTRU may make and report an interference measurement during a certain time period (for example, on a certain frequency channel) and the eNode-B may not detect the interference, the eNode-B may use that information to learn of interference seen by the that it does not see which may be from a hidden node.

Figure 5:
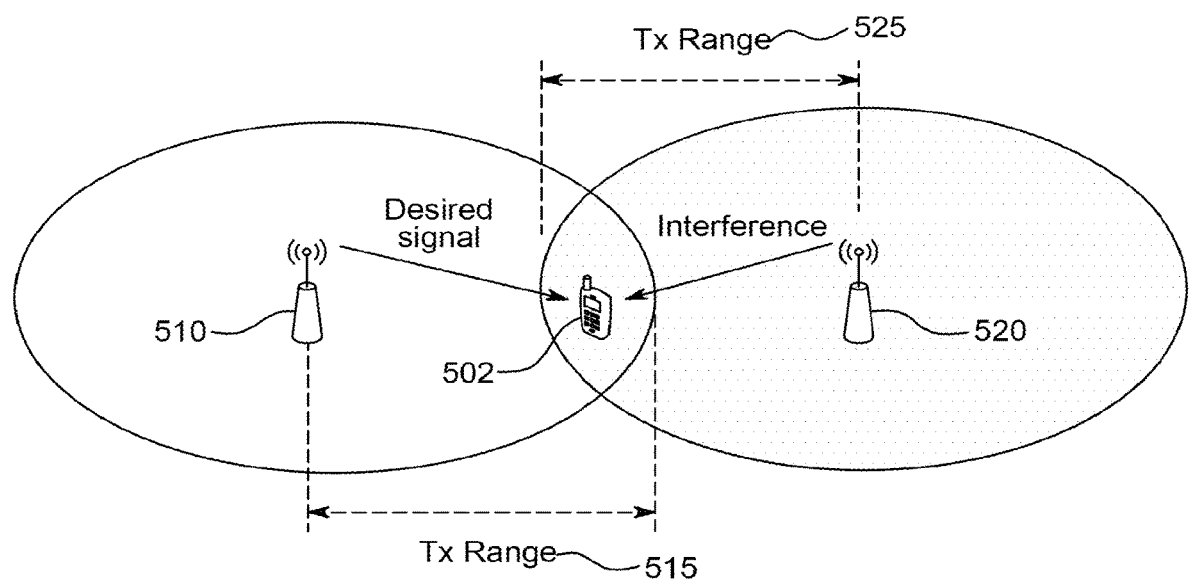
FIG. 5 is a system diagram of an example of a wireless system including a hidden node.

FIG. 5 is a system diagram of an example wireless system including a hidden node. As shown in system 500, the WTRU 502 may be in communication with Node 510 and lie in the transmission range 515 (e.g., coverage area) of Node 510. WTRU 502 may receive information (e.g., a desired signal) from that Node 510. The same WTRU 502 may also lie in the transmission range 525 (e.g., coverage area) of Node 520, and, therefore, the WTRU 502 may receive one or more interfering signals (e.g., interference) from Node 520. However, Node 510 may not detect the presence of Node 520, since Node 510 may be located outside of the transmission range 525 (e.g., coverage area) of Node 520. In this case, the WTRU 502 may measure the interference from Node 520, may detect the presence of Node 520 and may report those measurements to Node 510. Consequently, Node 510 may become aware of the presence of Node 520, e.g., the hidden node (from the perspective of Node 510), and may adjust its own transmission(s) accordingly.

Measurements may assist an eNode-B in selecting an appropriate channel and/or SCell to assign to a WTRU which may enable more effective use of LAA channels. Such measurements may (or may also) enable an eNode-B to switch between LAA channels, for example quickly such as per active time period.

A WTRU may observe and/or measure a channel and/or one or more measurement-related signals and/or may report one or more reporting parameters and/or measurement types, for example to its serving eNode-B or cell, for example, its PCell or via its PCell.

Reporting parameter, measurement parameter, and measurement type may be used interchangeably. Report, measurement report, measurement feedback report, and feedback report may be used interchangeably.

A WTRU may, for example, dynamically, receive implicitly and/or explicitly a measurement indication for one or more reporting parameters. The WTRU may receive and/or apply separate or different measurement indications for separate or different reporting parameters.

A WTRU may include, for example, in a measurement report or as part of a reporting mechanism one or more reporting parameters and/or measurement types and/or an indication of the channel resources for which the (or each) parameter and/or measurement type may have been calculated.

A WTRU may be configured and/or requested, for example, dynamically, by the eNode-B to make or take a measurement. The configuration and/or request may indicate to the WTRU a set of channel resources (such as subframes and/or PRBs) on which it may perform the measurements. The WTRU may be configured and/or provided with a set of measurement types it may perform using the resources. The WTRU may use some or all of the indicated channel resources to perform one or more of the configured and/or provided measurement types.

In a measurement feedback report, the WTRU may indicate the measurement type that may be included and/or the set or subset of resources (for example, subset of the channel resources configured or indicated by the eNode-B) which may have been used for the measurement. The set or subset of resources may, for example be indicated as an index, for example, to the eNode-B. As an example, a WTRU may report the subframes or time period for which a reporting parameter, for example, CQI, PMI, RI, CSI-RS related parameters or measurements, for example, RSRP, RSRQ, RSSI, eRSSI, interference, SNR, SINR, and the like, may have been measured and/or calculated. The subframes may be identified by an index or indices (for example, exact or absolute index or indices of the subframes).

A WTRU may perform a measurement in or using a channel resource by looking for or measuring a specific measurement-related signal or characteristic of a measurement-related signal. The WTRU may report one or more of the following, for example, for a measurement-related signal: received signal strength, received interference level, received total energy and/or power, received noise power, and the like.

A WTRU may perform a measurement in, using, or on a channel resource regardless of whether or not that resource may contain a (or the desired, expected, or intended) measurement signal.

The WTRU may report, for example, for a measurement process, a measured signal, and/or a measured channel, one or more of: received signal strength, interference level, total received energy and/or power, noise power, and the like.

A WTRU which may be configured with measurements (and/or requested to perform measurements) on one or more LAA channels and/or LAA cells or SCells may report or feedback measurements for one or more (for example, any) of the measurement types and/or parameters described herein. The report or feedback may be provided or transmitted by the WTRU on the WTRU's PCell and/or one or more of its SCells and/or LTE-U SCells. Feedback or reporting may be one or more of periodic, on-demand, according to schedule, enabled and/or disabled, activated and/or deactivated, and/or event triggered.

A WTRU may be configured with reporting occasions. The configuration may be included with the configuration of the measurement type for which the occasions may apply. The reporting occasions may be subject to one or more of activation/deactivation, enable/disable, start/stop, and/or an on-demand request.

A WTRU may be configured with LAA channel measurement gaps. The measurement gaps may be configurable, for example, dynamically, which may enable WTRU measurements to reflect use of the LAA channels which may be non-uniform.

A WTRU may perform measurements on one or more LAA channels and/or LAA cells, for example, aperiodically and/or when triggered by its serving eNode-B or cell (for example, PCell). For example, the WTRU may be configured or pre-configured (and/or receive measurement indications) with one or more measurement types and may make measurements of one or more of those measurement types, for example, autonomously and/or when requested. The WTRU may report some or all of the measurements, for example, upon (or in response to) receiving a request for measurement feedback from the eNode-B.

The WTRU may be granted UL resources, for example, in a scheduling grant or in a measurement feedback request. The resources may be granted in a DCI format which may be provided via a (E)PDCCH transmission which may be from a PCell. The WTRU may report measurements which it may take (or make) on one or more LAA channels and/or LAA cells or SCells on the granted UL resources.

For example, the WTRU may be configured semi-statically with a plurality of sets of LAA channels and/or LAA cells for which it may make measurements. The sets may or may not include LAA cells and/or channels activated for the WTRU. The sets may or may not include LAA cells configured as serving cells for the WTRU. The sets of LAA channels and/or LAA cells may be configured with specific time and/or frequency resources on which the measurements may be made. In one example, the time when a WTRU may make measurements on some LAA channels and/or cells (e.g., one or more channels and/or cells which may not be configured and/or activated for the WTRU) may be configured as measurement gaps. In an example, a set of LAA channels and/or cells may be assigned an index. In another example, each set of LAA channels and/or cells may be assigned an index.

A DCI which may be transmitted to a WTRU may provide a measurement indication to the WTRU. The measurement indication may be or include an LAA measurement request and/or a measurement report request. The indication may be in the form of an information element, which may be a new information element in an example, or a string of bits. The indication (for example, codepoints of the string of bits) may request or instruct the WTRU to perform at least one measurement related operation.

For example, the measurement indication may request (or indicate to) the WTRU to at least make a measurement on one or more (or in an example, each) channel and/or cell of a set of LAA channels and/or cells. The set may be indicated by an index which may be included with the measurement indication.

In another example, the measurement indication may request (or indicate to) the WTRU to at least report a measurement for one or more (or in an example, each) channel and/or cell of a set of LAA channels and/or cells. The set may be indicated by an index which may be included with the measurement indication. A request (or indication) for a measurement report may include or imply for the WTRU to make the related measurement or measurements.

In a further example, the measurement indication may request (or indicate to) the WTRU to at least report a measurement for each channel and/or cell of a set of LAA channels and/or cells for which the measurement is above or below a threshold. The number of channels and/or cells for which the measurements may be reported, for example, in a certain report, may be limited to M which may be configured by the eNode-B, known, or determined by the WTRU.

In an additional example, the feedback resources (for example, for the WTRU to use for the measurement report) may be included (for example, identified or granted) in the DCI. The resources may be pre-configured and may be selected or identified in the DCI, for example, by an index or other identifier included in the DCI. The resources may be time and/or frequency resources and may be in at least one subframe for performing the measurement in an unlicensed band.

The WTRU may then perform the measurement according to the request and send a report to the eNode-B based on the performed measurement. In a further example, the at least one subframe for performing the measurement may be the subframe of the request or a window of subframes beginning with the subframe of the request. In yet another example, the measurement report may include an identification of a subframe or System Frame Number (SFN) associated with the measurement. In still another example, the measurement report may be sent using the licensed and/or unlicensed frequency band.

In yet another example, the measurement indication may request (or indicate to) the WTRU to delete all previously made measurements for a set of LAA channels and/or cells. This may enable control over measurement filtering.

In yet a further example, a measurement indication for a set of LAA channels and/or cells may request or imply for the WTRU to delete all previously made measurements for the set of LAA channels and/or cells. For example, any measurement indication for a set of LAA channels and/or cells may request or imply for the WTRU to delete all previously made measurements for the set of LAA channels and/or cells. The measurement indication may request (or indicate to) the WTRU to begin event-based triggering of measurement reporting for a set of LAA channels and/or cells.

In yet an additional example, the measurement indication may include or identify time and/or frequency resources (for example, REs and/or PRBs) on or in which to make the measurements. These resources may be considered as configured resources for the measurement.

A measurement indication for or corresponding to a set of LAA channels and/or cells may include an indication of the set. A set may be or include a single LAA channel and/or LAA cell. A WTRU may receive a measurement indication in a DCI transmitted on an LAA channel and/or cell. The measurement indication may (for example, implicitly) request a measurement or measurement report for that LAA channel and/or cell.

An eNode-B may provide the measurement indication via a serving cell of the WTRU such as the PCell, an LAA Scell, or a non-LAA SCell of the WTRU. Upon or in response to receipt of a measurement indication, the WTRU may make, report, and/or delete measurements in accordance with the indication.

Upon (or after or in response to) being configured and/or requested to make and/or report LAA measurements (for example, via an LAA measurement indication), a WTRU may perform measurements on the appropriate time and/or frequency resources. For example, a WTRU may measure the total energy included in the configured or identified set of REs and may average it out for the entire bandwidth of a symbol. In another solution, a WTRU may sum the total energy in the configured or identified time and/or frequency resources. The WTRU may also be configured with filters to better evaluate the interference. For example, a WTRU may be configured with filters to average out the measurement over multiple OFDM symbols, possibly over a specific time period (for example, 3 measurements within 200 ms). The measurements may be updated as a sliding window whenever a new valid time and/or frequency resource is used to make a measurement. A WTRU may be configured with reporting thresholds, for example, for WTRU event-driven reporting. Examples of the thresholds triggering measurement feedback include at least one of: a minimum (or maximum) value has been achieved, an offset change in value is observed over adjacent measurement opportunities, an offset difference between two LAA channels and/or cells has been measured (for example, an offset difference between a measurement cell and a serving cell).

When reporting the measurement, the WTRU may be configured with a table mapping measurement ranges to report codepoints. The WTRU may be configured with multiple tables, or may be dynamically or semi-statically provided with a subset of the reporting table. This may enable different measurement reporting granularity.

An eNode-B may, in a request for measurement feedback (for example, a request for a measurement report), indicate to a WTRU a measurement type (for example, to measure and/or report) and may indicate the related measurement configuration. For example, a WTRU may receive a measurement or other indication or request, for example, in a DCI, that may include information on the type of measurement to make and/or report and/or the resources on which the measurement may be taken (or made). The WTRU may measure and/or report the indicated one or more measurement types to the eNode-B, for example in granted resources which may be provided with the feedback (for example, report) request or in the future.

Dynamically indicated resources on which a WTRU may take measurements may be considered an aperiodic measurement gap within which a WTRU may perform a plurality of measurements. The eNode-B may configure the WTRU with a period of time within which it may make measurements. A WTRU which may be configured with a set of resources (for example, subframes and/or PRBs) may perform measurements on a subset of the set of resources. For example, a WTRU may be configured with multiple subframes to make measurements. The WTRU may make a first measurement on a first subset of subframes and a second measurement (for example, which may be the same type as the first measurement) on a second subset of subframes. The WTRU may be configured to report a plurality of measurements where a report may include one or more of the measurements and/or the subset of resources on which one or more of the measurements was performed. The measurement types may include one or more of those described herein.

A WTRU may perform an averaging process in time and/or frequency domain for a measurement parameter which may be observed on multiple channel resources which may be indicated in or by a measurement indication.

A WTRU may be configured and/or implicitly and/or explicitly receive a parameter which may describe and/or include an averaging window which may be in a time and/or frequency domain. The WTRU may (or may only) consider the channel resources in the averaging process which may be within the limits of the averaging window.

As an example, a WTRU may calculate the average interference that it may observe or measure in a certain number of, for example, 24, REs (for example, center REs) which may be in specific OFDM symbols, for example, in every odd OFDM symbol (which may be indicated as a part of measurement indication with a OFDM symbol repetitive pattern of "01"). The WTRU may receive a time average window length of a specific number of, for example, 4, OFDM symbols. The WTRU may (or may only) consider the indicated OFDM symbols in the indicated time window, for example, when averaging the interference. For example, the WTRU may (or may only) consider 2 odd OFDM symbols when averaging the interference levels of the center 24 REs since there are only two odd numbered OFDM symbols in a 4-OFDM-symbol period.

The WTRU may (or may only) use the channel resources for the measurement which may be within the averaging window and which may be indicated in the related measurement indication. An averaging window may be described frequency and/or time domain. The averaging window may be defined by its OFDM symbol length, for example, 4, and number of subcarriers, for example, 24.

A WTRU may average a measurement parameter over a certain time frame. The WTRU may report the average value to the eNode-B as a part of measurement report.

The WTRU may report a measurement or measurement parameter for one or more measurement types when triggered, for example by an event which may be based on the measurement value or a change in the measurement value.

Occasions for event triggered measurement reporting may be pre-configured. For example, a WTRU may be configured with resources which it may use when a measurement report has been triggered. In another example, a WTRU may indicate in an UL scheduling request message that the purpose of the UL transmission may be for reporting event-triggered measurements.

The events that may trigger measurement reports may be configured, for example per measurement and/or per LAA channel. For example, an interference measurement of a certain level or value on a first LAA channel may trigger (or be configured to trigger) reporting of the measurement (or the event), while the same interference measurement level or value on a second LAA channel may not trigger (or may not be configured to trigger) reporting of the measurement (or the event).

An event of a first measurement which may trigger a report of or for the first measurement may (or may also) trigger or lead to a report of or related to a second measurement. For example, the interference measured on a first LAA channel may trigger a report of that measurement (or the event) and may (or may also) trigger or result in the report of one or more other interference measurements which may be taken on one or more other LAA channels which may be configured.

As another example, an interference measurement on an LAA channel may trigger reporting of that measurement as well as another type of measurement (for example eRSSI) on the same LAA channel. The measurement that may trigger a report may not be the measurement that may be reported.

In response to an event which may relate to a measurement such as a measurement type described herein, a WTRU may transmit a report or measurement report, for example, to an eNode-B. The event may or may be considered to trigger the report.

One or more events may trigger one or more measurements and/or one or more reports. An event which may trigger a measurement and/or a report may be receipt of a measurement indication which may include a grant for UL resources on which to transmit the report. An event which may trigger a measurement and/or a report may be receipt of a grant (for example, an aperiodic grant) for UL resources which may be provided by the eNode-B to report measurements. The UL grant may include an indication of channel resources on which the WTRU may perform measurements. The UL grant may include or indicate the UL resources where or on which the WTRU should report such measurements.

A report may be triggered when a measurement may be (or may become) greater than (or less than) a configurable (or configured) threshold value. A report may be triggered when a measurement in an occasion (or set of occasions) may be (or may become) offset greater than (or offset less than) a measurement (for example, of the same type) in another occasion (or set of occasions) that may or may not have been previously reported. For example, a WTRU may report a measurement type and may (or may only) report the measurement type again if it may have increased (or decreased) by a threshold value from the last report.

A report may be triggered when a measurement type may be (or may become) offset greater (or offset less than) a measurement or measurement type that may be taken on another LAA channel. For example, the WTRU may report a measurement on a first LAA channel if the measured value may be offset greater than that of a second (for example, reported) measurement on a second LAA channel.

A report may be triggered when a measurement may be (or may become) greater than or less than a configurable (or configured) threshold, for example for a configurable (or configured) number of times (for example, consecutive times) in a configurable (or configured) duration. For example, a WTRU may be configured, for example, dynamically, with a set of resources on which it may make a measurement (for example, RSSI or eRSSI) on an LAA channel. If more than a configured number of individual measurements (where each may be measured on a subset of resources within the set of resources) may exceed a configured threshold, the WTRU may report one or more measurement values and/or an indication that the condition has been met. This may enable the eNode-B to determine one or more parameters of the traffic in an LAA channel which may be non-uniform.

An event which may trigger a report may be a trigger for RSRP and/or RSRQ. A report which may correspond to a trigger for RSRP and/or RSRQ on an LAA channel may (or may also) include one or more of RSRP, RSRQ, RSSI or eRSSI, interference, SINR, and/or radar detection measurements. For example, when a WTRU may be triggered to report RSRP on an LAA SCell, it may also include the RSSI or eRSSI of the LAA channel on which the LAA SCell may operate.

A WTRU may be configured, for example, dynamically, with a set of resources on which it may perform multiple measurements which may be of the same type and/or which may be on subsets (for example, different subsets) of the set of resources. One or more (for example, any) of the measurements may trigger a measurement feedback report.

In a report which may be triggered by one measurement, a WTRU may (and/or may be configured to) report one or more other measurements. A measurement event for one measurement may trigger a WTRU to perform and/or report another measurement. For example, a WTRU may be configured with a set of subframes on which to take interference measurements. The WTRU may measure interference on a first subframe. Upon (or as a result of) comparing it to a threshold, the WTRU may be triggered to measure and/or report interference from one or more other subframes in the configured set of subframes.

The WTRU may report one or more of the interference measurements to the eNode-B. The WTRU may include subframe information (for example, a subframe index) for each measurement which it may report. The WTRU may (for example, first) request UL resources for transmission of the report. The WTRU may transmit the report in UL resources which may have been granted with the measurement request (for example, dynamic measurement request) from the eNode-B.

In an example, a WTRU may monitor the interference level in the current configured LTE-U SCell where the WTRU may be configured with a related threshold monitoring value. When the interference level of that channel may go above the configured interference threshold, the WTRU may inform the eNode-B of the event. The eNode-B may change some parameters of that LTE-U SCell, for example, the frequency channel, when it may receive a high interference report from one or more of its WTRUs.

In another example, a WTRU may monitor received signal strength in the current configured LTE-U SCell where the WTRU may be configured with a threshold monitoring value. When the received signal strength level of the LTE-U SCell may go below the configured signal strength threshold, the WTRU may inform the eNode-B of the event. The eNode-B may change some parameters of that LTE-U SCell, for example, the frequency channel, when it may receive the low signal strength report from one or more of its WTRUs.

In another example, the WTRU may, for example, continuously, monitor one or more (for example, other) LTE-U cells and/or one or more (for example, other) LTE-U frequency channels. When a measurement parameter of an LTE-U cell and/or frequency channel may go below and/or above a certain threshold, the WTRU may report the event and/or one of more characteristics of one or more of those cells and/or channels to its eNode-B.

The eNode-B may use a measurement indication to request or configure one or more WTRUs to measure one or more LAA frequency channels. A WTRU may, for example, in response to a measurement indication, measure the interference level and/or total received power and/or other interference-related parameters in the channel resources indicated as part of the measurement indication. The WTRU may report an interference level and/or one or more other indications for one or more frequency channels to the eNode-B. An example of another indication may be whether the interference level may be above or below a threshold.

Another example of another indication may be the cell ID of another LAA cell which may be using the channel.

The eNode-B may use the reports it may receive from one or more WTRUs to choose a frequency channel, for example, one with the lowest detected interference level and/or total received power or least average interference for some or all of its WTRUs. The eNode-B may use the reports it may receive from one or more WTRUs to determine if and/or where and/or near which WTRUs there may be hidden nodes. The eNode-B may change the frequency channel and/or resources it may schedule on an LAA cell for one or more WTRUs, for example, based on the reports it may receive.

A WTRU may perform measurements on and/or provide reports for its currently configured and/or activated LTE-U cell and/or one or more other LTE-U cells and/or candidate frequency channels.

In unlicensed spectrum, the users of the band and hence the interference environment may change frequently. It may be useful for an LAA cell to adapt to these changes, for example to improve performance.

In one example, an LAA cell may, for example, dynamically, change and/or allocate different resources (for example, time and/or frequency resources) to different channels and/or signals, such as channels and/or signals which may be used for measurements. Channels and/or signals which may be used for measurements may be called measurement-related signals. Time and/or frequency resources may be called channel resources.

For example, an LAA cell may transmit one or more channels and/or signals (for example, measurement-related signals), for example synchronization signals and/or CSI-RS signals, in channel resources which may experience less interference compared to other channel resources.

LAA cells which may use a channel at the same time may put one or more of their measurement-related signals in different channel resources. An LAA cell may modify, for example, dynamically, the time, location (for example, in frequency) and/or density (for example, repetition density) of one or more channels and/or signals (for example, measurement-related signals), for example to optimize the use of channel resources as needed.

The term time/frequency may be used to represents time and/or frequency.

CSI reporting which may be for an LAA cell may be provided and/or used. The CSI reporting may be aperiodic, on-demand, and/or triggered. Aperiodic, on-demand, and triggered may be used interchangeably. Reference signal, CSI-RS, CRS, DM-RS, DRS, measurement reference signal, reference resource for measurement, CSI-IM, and measurement RS may be used interchangeably.

In an example, the location of a measurement reference signal for a CSI measurement may be in a certain time/frequency location of a LAA cell. For example, the time, frequency, or time/frequency location of the reference signal may be determined (for example, by the WTRU) as a function of at least one of: the subframe number where a CSI (for example, an aperiodic CSI) measurement and/or reporting may be triggered, the channel number in a LAA cell for which a WTRU may (or may need to) measure CSI, a transmission mode which may be configured, a periodic reporting mode, and an (E)PDCCH candidate number from which a WTRU may receive or may have received a CSI (for example, an aperiodic CSI) measurement and/or reporting trigger. The reference signal may be used, for example, by a WTRU, for CSI reporting such as CQI, PMI, and/or RI reporting, for example according to the transmission mode configured.

The reference signal may be a CSI-RS which may be transmitted within a subframe. The CSI-RS may be: non-zero-power CSI-RS on which a WTRU may estimate the serving cell channels to measure the CSI; zero-power CSI-RS, where a WTRU may rate-match around the PDSCH for the zero-power CSI-RS resources, for example, if a PDSCH may be scheduled for the WTRU or an EPDCCH may be monitored by the WTRU; CSI-IM, on which a WTRU may measure interference; or one or more combinations of non-zero-power CSI-RS, zero-power CSI-RS, and CSI-IM.

A WTRU may be requested or indicated by the eNode-B to report a CSI (for example, an aperiodic CSI) which may be associated with an LAA cell. In an example, the reporting (for example, aperiodic reporting) may be triggered in subframe n and the measurement reference signal may be located in subframe n+k. The measurement reference signal location may be determined as a function of the subframe number which may be triggered for CSI reporting (for example, aperiodic CSI reporting). The WTRU may report the CSI (for example, aperiodic CSI) in subframe n+k+s, for example in or via the PCell. The CSI (for example, aperiodic CSI) reporting triggering may be based on a DCI which may be transmitted via (E)PDCCH, for example in or by the PCell. k and/or s may be a number (for example, a predefined number) including 0. k and/or s may be configured by higher layer signaling, or may be indicated in the DCI, for example with an RNTI such as C-RNTI or CSI-RNTI.

C-RNTI may be used in place of CSI-RNTI and vice versa and still be consistent with this disclosure.

A DCI with a certain RNTI (for example CSI-RNTI) may be used to trigger the CSI (for example, aperiodic CSI) reporting for an LAA cell. The RNTI may be a group RNTI. For example, a DCI with CSI-RNTI may be transmitted in a (E)PDCCH search space (for example, common search space) which may be in a PCell. A WTRU which may be configured with a LAA cell may monitor a DCI with CSI-RNTI in (E)PDCCH search space (for example, common search space). A WTRU may measure CSI in subframe n+k if the WTRU may receive a DCI with CSI-RNTI in subframe n. The RNTI (for example CSI-RNTI), which may be a group RNTI, may be configured in a WTRU-specific manner, or may be configured, provided, or predefined in a cell-specific manner.

The DCI which may be used to trigger the CSI reporting (for example, aperiodic CSI reporting), for example, the DCI with CSI-RNTI may include one or more of following: a subframe index or a subframe offset to indicate the subframe (or the number of the subframe) which may contain the measurement reference signal in LAA cell; a configuration of the measurement reference signal (for example CSI-RS but not limited to CSI-RS) which may include at least one of CSI-RS reuse pattern, CSI-RS configuration index, number of antenna ports, CSI process number, physical or virtual Cell ID for scrambling; SCell number or index, for example if multiple SCells may be used; and Uplink resource information, for example, in the PCell, for CSI reporting. The DCI with CSI-RNTI may be located in (or only in) a subset of subframes.

A DCI, such as one which may have a purpose other than triggering CSI reporting, may or may also be used to trigger CSI (for example, aperiodic CSI) reporting for an LAA cell. For example, a DCI which may be used to provide a DL grant (for example, for resources on an LAA cell) may (or may also) be used to (or may include a) trigger for CSI reporting which may include measuring and/or reporting interference. The interference may be measured on resources such as CSI-IM resources. The resources may be indicated (for example, explicitly or by reference to a configuration) in the DCI or may be configured separately. The DCI may be or include a DL grant and/or an UL grant for a serving cell of the WTRU which may be a PCell or SCell in licensed or unlicensed band.

In response to receipt of the trigger, the WTRU may make and/or report the indicated or requested measurement. The WTRU may make the measurement on or using the indicated resources which may be CSI-IM resources.

In another example, the location of a measurement reference signal for a CSI measurement may be in a certain time/frequency location of LAA cell. For example, the time, frequency, or time/frequency location of the reference signal may be indicated via the control information which may trigger a CSI (for example, aperiodic CSI) measurement and/or reporting. A DCI which may (or may be used to) trigger a CSI (for example, an aperiodic CSI) measurement and/reporting, for example, associated with an LAA cell, may contain the measurement reference signal configuration. The configuration may include at least one of following: the subframe index or a subframe offset which may indicate the subframe (or the number of the subframe) which may contain the measurement reference signal; the measurement reference signal reuse pattern; and configuration for one or more zero-power CSI-RS, non-zero-power CSI-RS, and/or CSI-IM.

In another example, a measurement reference signal may be transmitted, for example, aperiodically, based on the time (or timing or time location) of one or more LAA resource bursts. An LAA resource burst may be at least one of time resources (for example subframes) which may be allocated, for example, continuously or regularly, for an LAA cell, time resources (for example, subframes) within a time window in an LAA cell, and/or time resources (for example, subframes) which may be allocated for a WTRU. Time resources which may be allocated may be configured in the WTRU, for example, by the eNode-B. Configuration may be via the PCell.

A subframe which may contain the measurement reference signal may be determined as a function of at least one of SFN number, for example, in the PCell, a periodicity which may be configured, a subframe offset which may be configured via higher layer signaling, and/or resource availability and/or allocation in an LAA cell.

The measurement reference signal may be located in one (or more) of the subframes in an (for example, each) LAA resource burst. In an example, the first subframe in an (for example, each) LAA resource burst may contain the measurement reference signal. The n-th subframe in an (for example, each) LAA resource burst may contain the measurement reference signal, where n may be predefined, or higher layer configured.

The measurement reference signal may be located in a subset of subframes of an LAA resource burst. For example, an LAA resource burst which may be located in a specific SFN may contain the measurement reference signal.

An indication may be provided and/or used for an LAA resource burst which may contain a measurement reference signal. The indication may be transmitted in the first time resource (for example the first subframe) of the LAA resource burst. The indication may be transmitted in the control signaling which may be used to carry the scheduling information of the LAA resource burst.

In another example, a timer may be used to trigger a CSI (for example, aperiodic CSI) measurement and/or reporting. For example, a timer may be set or configured (for example, in a WTRU) by the eNode-B. If and/or when and/or following when the timer may expire (for example, reach zero), the WTRU may measure CSI in a subframe, for example the closest (for example, in time) subframe which may contain the measurement reference signal. One more of following may apply: The timer may be WTRU-specific, predetermined, or configured via a higher layer signaling. The timer may be determined, for example, by the WTRU, as a function of WTRU mobility. The timer may be paused, for example, by the WTRU, when the LAA cell may not be active, for example, in off state. The time may be resumed when the LAA Cell may become active again. When the timer may expire or reach to zero, the reporting (for example, aperiodic reporting) may be triggered, for example, by the WTRU, right away. The LAA Cell may not be active at the time that timer may expire or reach zero. When the timer may expire or reach zero and/or when the LAA Cell may not be active, for example, in off state, the reporting (for example, aperiodic reporting) may not be triggered, for example, by the WTRU. The reporting (for example, aperiodic reporting) may be pending, for example, in the WTRU, until the LAA cell may become active again. The timer may be started or restarted, for example, by the WTRU, when (or following when) the WTRU may report the measurement.

In another example, a PUCCH in PCell may be used, for example, by the WTRU, for reporting (for example, aperiodic reporting) of an LAA cell. For example, CSI reporting (for example, aperiodic CSI reporting) may be triggered for an LAA cell in subframe n and the CSI reporting (for example, aperiodic CSI reporting) for the LAA cell may be transmitted via PUCCH in the PCell, for example in subframe n+k+s where subframe n+k may contain the measurement reference signal. One or more of the following may apply: The CSI reporting mode based on PUCCH (for example, PUCCH CQI feedback type) may be used for CSI reporting (for example, aperiodic CSI reporting). For the CSI reporting (for example, aperiodic CSI reporting), a PUCCH based CSI reporting mode (for example, which may use PUCCH resources) may be used for LAA cell and/or a PUSCH based CSI reporting (for example, which may use PUSCH resources) may be used for PCell. A subset of PUCCH based CSI reporting modes may (or may only) be used for LAA cell as a CSI reporting (for example, an aperiodic CSI reporting) mode. For example, wideband PMI/CQI/RI reporting mode (for example Mode 1-0 and Mode 1-1) may (or may only) be used for aperiodic CSI reporting. The PUCCH resource in PCell for reporting (for example, aperiodic reporting) may be configured via higher layer signaling in a WTRU-specific manner.

The PUCCH resource may be indicated in the associated DCI which may be used for reporting (for example, aperiodic reporting) triggering. The PUCCH resource may be determined as a function of the PUCCH resource index in the associated DCI. The starting (E)CCE number of the (E)PDCCH which may contain the reporting (for example, aperiodic reporting) triggering may be used to indicate the PUCCH resource index for the CSI (for example, aperiodic CSI) reporting.

One or more (for example, two) types of CSI reporting (for example, aperiodic CSI reporting) modes may be used for LAA cell. For example, a PUCCH based CSI reporting (for example, aperiodic CSI reporting) mode (for example, PUCCH CQI feedback type) and/or a PUSCH based CSI reporting (for example, aperiodic CSI reporting) mode (for example, PUSCH CQI feedback type) may be used.

The CQI feedback type may be determined based on a timer. For example, the PUCCH CQI feedback type may be used if a timer expires, otherwise the PUSCH CQI feedback type may be used, or vice versa. The CQI feedback type may be configured by the eNode-B, for example, via higher layer signaling. If and/or when a CSI reporting (for example, an aperiodic CSI reporting) may be triggered, the CQI feedback type may be based on the configuration which may be provided by the higher layer signaling. Alternatively, the CQI feedback type may be dynamically indicated, for example, in the associated DCI which may be for the CSI report (for example, aperiodic CSI report) triggering.

One or more (for example, two) RNTIs which may be group RNTIs may be defined to indicate the CQI feedback type. For example, aCSI-RNTI and pCSI-RNTI may be defined. The aCSI-RNTI may be used to indicate a PUSCH CQI feedback type and the pCSI-RNTI may be used to indicate a PUCCH CQI feedback type.

Interference measurement reporting which may be aperiodic, on-demand, and/or triggered measurement reporting may be provided and/or used. Aperiodic, on-demand, and triggered may be used interchangeably. Interference measurement, interference level reporting, measured interference, interference signal strength, signal power in the interference measurement reference signal, and measurement in CSI-IM may be used interchangeably.

In an example, a WTRU may be requested or indicated, for example, by an eNode-B, to measure an interference level in a certain time/frequency resource (or resources). The time/frequency resource (or resources) for the interference measurement may be or may include a measurement reference signal which may be located in a subframe. The interference measurement may be performed using the measurement reference signal within the subframe. The interference measurement reference signal (IM-RS) may be at least one of CSI-IM, CSI-RS, zero-power CSI-RS, and CRS.

The configuration information for IM-RS may be provided to a WTRU which may be requested (or indicated) to measure an interference level using the IM-RS. The configuration may be provided by an eNode-B. For example, a DCI may be used to trigger the interference level reporting and the IM-RS configuration may be transmitted in the DCI. The IM-RS configuration may include at least one of a reference signal pattern and/or reuse pattern; a scrambling code; a power allocation; and a subframe location and/or number.

The DCI may be received in the PCell (or an LAA Cell) and the IM-RS may be located in the LAA Cell. An interference measurement triggering bit field may be defined in the DCI which may be an independent bit field from a CSI (for example, aperiodic CSI) reporting triggering field. A DCI, for example with C-RNTI, may contain the reference signal configuration for interference measurement. A DCI which may be used for PDSCH scheduling in the LAA cell may contain the reference signal configuration for interference measurement. An RNTI (for example interference measurement RNTI such as IM-RNTI) which may be a group RNTI may be used to trigger the interference measurement for one or more (for example, a group of) WTRUs.

The IM-RS configuration may be determined as a function of at least one of the subframe number in which the interference level reporting may be triggered, (E)PDCCH candidate number in which a DCI which may trigger the interference level reporting may be triggered, and physical or virtual cell ID for the LAA Cell. The subframe (or subframe number) which may contain IM-RS may be determined as a function of the subframe (or subframe number) in which the interference level reporting may be triggered. A WTRU may monitor one or more (for example, multiple) (E)PDCCH candidates and the IM-RS configuration may be determined as a function of the (E)PDCCH candidates in which the interference level reporting may be triggered.

A WTRU may report the measured interference level in a certain subframe, for example, in a PCell. The subframe for the measured interference level reporting may be determined by one or more of following. The subframe for the interference level reporting may be determined as a function of the time location of the subframe containing the associated IM-RS. For example, if the associated IM-RS may be located in subframe n, the measured interference level may be reported by the WTRU in subframe n+k, where n and k may be positive integer numbers.

The subframe for the interference level reporting may be determined as a function of the time location of the subframe in which the interference level reporting may be triggered. For example, if the interference level reporting may be triggered in the subframe n, a WTRU may report the measured interference level in subframe n+k, where n and k may be a positive integer numbers.

Interference, (for example, IM-RS) measurement and/or reporting, for example, in response to a measurement request, may be conditional on one or more factors which may be indicated by the eNode-B (e.g., the eNode-B requesting the measurement and/or report) and/or determined by the WTRU. The one or more factors may include at least whether or not the LAA cell or channel for which the measurement is to be made and/or reported is active or within an active time, for example, with respect to the WTRU's serving eNode-B. Active time (for example, start, duration, and/or end of active time) may be indicated by the eNode-B, for example, in accordance with one or more of the embodiments described herein. Active time may be determined by the WTRU based on the indication or by blind decoding for the presence of one or more signals such as a sync or busy signal.

For example, if a WTRU is requested to make an interference measurement in a time resource (for example, one or more subframes, timeslots, or symbols) of an LAA cell, the WTRU may first determine (for example, prior to the time resource or the start of the time resource) whether the LAA cell is in an active time (and/or will be in an active time when the measurement is to be made), for example, with respect to the WTRU's serving eNode-B.

The WTRU may (or may only) make the requested measurement and/or report the requested measurement if it determines the LAA cell is (or is not) in an active time and/or will (or will not) be in an active time when the measurement is to be made. Active time with respect to an eNode-B may mean or correspond to a time when the eNode-B has the LAA channel and/or may transmit on the LAA channel. When the one or more factors on which the condition for making the measurement and/or report is or are true, the IM-RS resource associated with the measurement and/or report may be considered or determined to be valid.

The WTRU may send an interference report if at least one of the following is applicable: the applicable IM-RS resource has been determined to be valid, a timer (for example, begun at the time of the last report) has expired, a reporting trigger has been achieved, and/or a valid reporting resource is available. A reporting resource may be considered (or determined to be) valid if at least one of the following happens: the WTRU has successfully acquired the unlicensed channel on which the measurement report is to be transmitted, the WTRU has been configured with resources on another cell which it may use to transmit the report, and the reporting resource has not been pre-empted for another purpose, e.g., transmission of a higher priority UL signal or channel.

In an example, a separate (for example, different) transmission time interval (TTI) length may be used for one cell, for example, the PCell, and another cell which may be an SCell, an LAA cell, and/or an LAA SCell. PCell may be used as a non-limiting example for the one or first cell. Scell may be used as a non-limiting example of the other cell.

For example, a TTI may be defined as 1 ms in PCell while the TTI for SCell may be shorter than 1 ms. One or more of following may apply. The TTI for SCell may be defined as a number of OFDM symbols which may be smaller than the number of OFDM symbols for a TTI in PCell. In an example, a TTI in PCell may contain 14 OFDM symbols with normal CP while a TTI in SCell may contain 2 OFDM symbols with normal CP. A radio frame (for example, for the SCell) may be defined as 1 ms with 7 subframes (for example, with 2 OFDM symbols each). In TDD, a radio frame (for example, for the SCell) may be defined as 1 ms with 7 subframes (for example, with 2 OFDM symbols each) which may be used or defined as uplink and/or downlink subframes.

A WTRU may report CSI based on the shorter TTI length and CSI reporting time (for example, delay) may be reduced.

A wider subcarrier spacing may be used for SCell which may shorten the OFDM symbol length. For example, 15 kHz subcarrier spacing may be used for PCell while 150 kHz subcarrier spacing may be used for SCell. The TTI for PCell may be defined as 1 ms while the TTI for SCell may be defined as 0.1 ms.

The reference resource which may be used for measurements may use (or may be assumed to use) shortened TTI. For example, a WTRU may be provided or indicated in a first reduced TTI occasion (for example in an OFDM symbol n), the reference resource on which measurements may be made. The location (for example, time location) of the reference resource may be (or may be a function of) the symbol where the indication may be or may have been received plus k OFDM symbols (where k may be or may be set to 0).

In an example, the reference resource may be comprised of multiple symbols which may begin at symbol k. The feedback may be reported in OFDM symbol n+k+s. For example a WTRU may be configured with measurements on CRS, and it may be requested or indicated in a first symbol of a subframe (such as symbol 0) to perform measurements. The reference resources for such measurements may be in symbols 4 to 8 (for example, k=4) and the feedback resources on the PCell may be included in the second subframe (for example, symbols 14 to 27, or k+s=14).

In another example, the processing time of a CSI measurement may be reduced, for example, if CSI may be outdated. For example, one or more (for example, two) types of CSI reporting may be used. One type of CSI reporting may use a regular CSI measurement which may have k subframe processing time. Another type of CSI reporting may use a simplified CSI measurement which may have s subframe processing time, where k may be larger than s.

One or more of following may apply: Type-A CSI and Type-B CSI. Type-A CSI reporting may have k subframe processing time. If a CSI reporting (for example, an aperiodic CSI reporting) may be triggered in subframe n, a WTRU may report a corresponding CSI feedback in subframe n+k. In an example, k may equal 4 for FDD. A WTRU may (or may need to) perform a full CSI measurement, for example, in this case.

Type-B CSI reporting may have s subframe processing time which may be smaller than k. If a CSI reporting (for example, an aperiodic CSI reporting) may be triggered in subframe n, a WTRU may report a corresponding CSI feedback in subframe n+s. A WTRU may perform a partial CSI measurement, for example, in this case (for example, for Type-B CSI reporting). A subset of CQI may be used. A subset of codebook may be used. A subset of rank may be used. A predefined CQI feedback type may be used. Alternatively, a WTRU may perform CSI measurement with wideband CQI/PMI/RI, for example, only. In an example, s may equal 1.

Measurement types which may support eNode-B decisions such as LAA channel section may be provided and/or used. One or more measurement types may enable an eNode-B to determine the appropriate LAA channel and/or LAA SCell to use for one or more WTRUs.

An eNode-B may use one or more measurement types described in one or more embodiments and/or examples herein to determine an (for example, the appropriate) LAA channel and/or LAA SCell to use for one or more WTRUs.

For one or more (for example, any) of the measurement types described herein, the trigger (for example, for the WTRU) to begin measuring may be the configuration (for example, the receipt by the WTRU of the configuration) of the measurement by or from the eNode-B. A measurement need not be monitored continuously when configured by the eNode-B. A measurement and/or report may be triggered dynamically, aperiodically, and/or on-demand.

A WTRU may be configured to report an RSSI-like (Received Signal Strength Indicator) measurement. The RSSI-like measurement may be the LTE RSSI measurement. The WTRU may be configured to perform and report RSSI measurements of one or more LAA channels. The reporting of the RSSI measurement may be independent of reports for RSRP and/or RSRQ.

The RSSI-like measurement may be an enhanced RSSI (for example eRSSI) measurement and may be comprised of the linear average of the total received power observed, for example in a configurable (or configured) amount of time and/or over a configurable (or configured) bandwidth. The configuration of the eRSSI measurement by the eNode-B may include the bandwidth over which the measurement may be taken (or made) and/or the time duration for the measurement. In an example, the time duration may be configured in units of LTE OFDM symbols. In another example, the time duration of an eRSSI measurement may be sub-LTE OFDM symbol length. For example, an eRSSI may be configured over a WIFI OFDM symbol length. The eRSSI measurement occasion may be synchronized with (for example, with the timing of) one of the WTRU's serving cells. In another example, the configuration of the eRSSI may include a timing offset (for example, in the order of microseconds) from the timing of one of the WTRU's serving cells.

The WTRU may be configured to make interference measurements on one or more LAA channels or cells. The WTRU may be provided with resources on which it may measure interference. For example, a WTRU may be configured with a set of REs and/or subframes on which it may make measurements. If the WTRU may have a serving cell on the LAA channel where it may be configured to make interference measurements, the WTRU may assume that its serving cell may not have transmissions, at least transmissions to the WTRU, in the resources configured for interference measurements.

A WTRU may measure interference of neighboring LAA cells. The WTRU may report interference per neighbor LAA cell or it may report the aggregate interference measured on multiple (for example, all) neighbor LAA cells. For example, a WTRU may measure interference on neighbor LAA cell-specific resources and may report the sum of multiple (for example, all) neighbor LAA cell interferences. In an example, the WTRU may be configured with the resources on which it may measure neighbor LAA cell interference, for example, by its serving cell (for example, it's PCell). In another example, the WTRU may autonomously determine the resources on which to measure the neighbor LAA cells' interference. For example, a WTRU may determine the neighbor cells' interference measurement resources based on a transmitted signal from the neighbor LAA cell. The element from which a WTRU may autonomously determine a neighbor cell's interference measurement resource may include at least one of: a neighbor Cell ID; busy and/or Synchronization and/or reference signal configuration; and a preamble.

A parameter of one or more of a Busy and/or Synchronization and/or reference signal configuration may indicate the resources for interference measurement.

An LAA SCell may transmit a preamble at the beginning of an active time which may explicitly or implicitly indicate to the WTRU the interference measurement resource.

A WTRU may measure interference of a neighbor cell on a configurable (or configured) signal. For example, a WTRU may measure the interference of a neighbor cell by a measurement on a reference signal. The WTRU may measure the CQI of a neighbor cell and feed that back to its serving cell (for example, PCell) as an interference measurement. The WTRU may be configured with a precoder assumption to determine the CQI. In another example, the WTRU may emulate interference measurements on a neighbor cell signal. For example, the WTRU may be configured with an emulation formula and may obtain the interference measurement by inputting a measurement on a neighbor cell signal and using the configured emulation formula.

The WTRU may report enhanced measurement reports when feeding back interference measurements for one or more LAA channels and/or one or more neighbor LAA cells. For example, a WTRU may be configured with a set of interference measurement resources on which it may measure interference (which may be on a channel or from a neighbor cell). For example, the set of interference measurement resources may be comprised of multiple measurement occasions. The WTRU may be configured with and/or use a function to determine the interference and/or what to report for the interference measurement resource sets.

The function which the WTRU may use and/or the report which the WTRU may transmit to the eNode-B may include the average interference measurement over the entire set of interference resources. The function which the WTRU may use and/or the report which the WTRU may transmit to the eNode-B may include the maximum or minimum interference measured on any subset of the set of interference measurement resources. For example, the WTRU may report the interference measurement resource where the maximum (or minimum) interference was measured, possibly along with the interference value. The function which the WTRU may use and/or the report which the WTRU may transmit to the eNode-B may include the number of interference measurement resources that exceeded or fell below a configurable threshold value. For example, the WTRU may be configured with a set of n interference measurement resources and may report the number of measurements k (where k n) that exceeded a threshold value. This may enable the eNode-B to determine the typical load of a channel over a period of time.

The WTRU may be configured to measure and/or report the SINR of a channel for an LAA cell. For example, the WTRU may be configured with resources on which it may measure the signal strength in an LAA channel. The WTRU may be configured with another set of resources on which it may measure interference plus noise of the LAA channel. The WTRU may reuse one or more of the methods described herein to measure the interference plus noise of an LAA channel. The SINR value may be quantized in order to limit the required feedback. In an example, the SINR may be quantized to two levels: unusable channel and usable channel. The usability of a channel may be defined as one where the WTRU may receive data from an LAA cell, for example with a certain or configurable (or configured) performance (for example BLER level).

A WTRU may be configured with one or more resources on which it may (or may attempt to) detect the presence of radar in an LAA channel. The measurement (for example, the measurement result or conclusion) may be binary, for example, either radar detected or not.

The WTRU may be configured with one or more resources (for example, special resources) which may be UL resources (for example, on the PCell) on which it may report radar activity in an LAA channel. Use of the resources to report a radar detection result (for example, radar detected) may be considered high priority and may have precedence over another (for example, any other) transmission from the WTRU which may collide with the report (for example, which may be scheduled or intended for transmission on the same UL resources).

The radar detection feedback resource may be shared by one or more (for example, all WTRUs) which may be operating in an LAA channel. The radar detected indication may be such that a (for example, any) WTRU that may detect radar on the LAA channel may transmit on the resource, for example, jointly. For example, each WTRU may transmit the same signal. This may ensure the eNode-B may be made aware of the presence of radar. In an example, the WTRU may, for example, periodically or regularly, report the radar detection status of a channel. In another example, the WTRU may trigger and/or transmit a radar detection report upon or as a result of (for example, only upon or only as a result of) identifying radar presence in an LAA channel.

In another example, a WTRU may use another (for example, any other) reporting mechanism defined herein to feedback interference-like measurements on an LAA channel. The WTRU may use or include an indication which may inform the network that the measurement being reported may be that of a detected radar, for example, and not a result of non-radar activity on the LAA channel. For example, a WTRU may be configured with interference measurement resources and the WTRU may report interference measurements according to an embodiment or example described herein. Upon or as a result of detecting radar activity on the interference measurement resource, the WTRU may trigger and/or transmit a report to the eNode-B which may include the interference measurement. The WTRU may or may also report or include in the report an indicator (for example, a flag) which may inform the network that the measured interference may be from radar and/or that radar may have been detected. The report may include identification of the channel on which the radar may have been detected.

A measurement may be triggered by the result of another measurement. For example, the WTRU may be configured with an interference measurement on an LAA channel. Upon (or as a result of) the interference measurement satisfying a configured condition (for example, the interference being present on a configured bandwidth) the WTRU may be triggered to perform another measurement type, such as radar detection measurements. This may enable a reduction in WTRU battery consumption.

Figure 6:
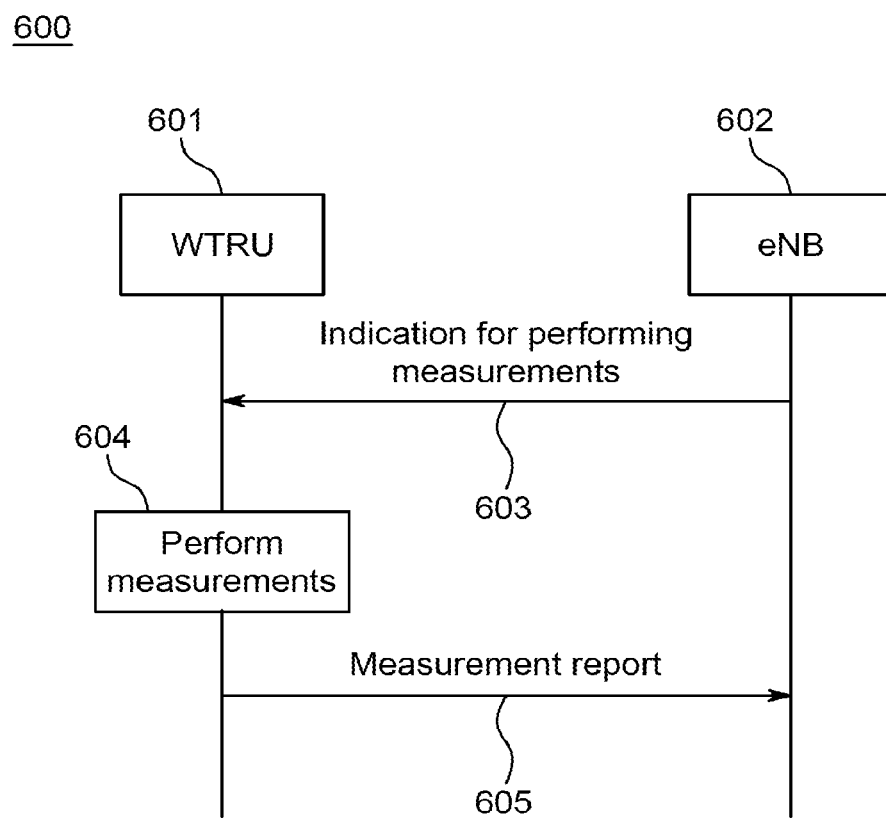
FIG. 6 is a signaling diagram of another example method for channel measurements and reporting mechanisms for LTE operation in an unlicensed band.

FIG. 6 is a signaling diagram of another example method for channel measurements and reporting mechanisms for LTE operation in an unlicensed band. A WTRU 601 may receive an indication 603 from an eNode-B 602. The indication may indicate time and/or frequency resources for performing measurements. The WTRU 602 may perform measurements 604 on the indicated time and/or frequency resources. The WTRU 602 may report the measurements 605 to the eNode-B 602.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method performed by a wireless transmit/receive unit (WTRU), the method comprising:
    receiving a radio resource control (RRC) message, the RRC message comprising configuration information indicating a set of one or more measurement-related signals, the set of one or more measurement-related signals being associated with a set of resource elements;
    receiving a first indication, the first indication indicating that the set of one or more measurement-related signals associated with the set of resource elements has been activated;
    receiving a second indication, the second indication indicating a request to report one or more measurements associated with the set of one or more measurement-related signals associated with the set of resource elements;
    sending at least one measurement report based on receiving the second indication, the at least one measurement report comprising one or more measurement values determined based on one or more measurements of the set of one or more measurement-related signals associated with the set of resource elements; and
    receiving a third indication, the third indication indicating that the set of one or more measurement-related signals associated with the set of resource elements has been deactivated.

2. The method of claim 1, wherein the first indication comprises an index corresponding to the set of one or more measurement-related signals associated with the set of resource elements.

3. The method of claim 2, wherein the index is indicated in the configuration information comprised in the RRC message.

4. The method of claim 1, wherein the set of one or more measurement-related signals comprise a first set of one or more non-zero power channel state information reference signals (CSI-RSs).

5. The method of claim 1, wherein the set of one or more measurement-related signals comprise a first set of one or more channel state information interference measurement (CSI-IM) signals.

6. The method of claim 1, wherein the configuration information indicates a plurality of sets of one or more measurement-related signals, each of the plurality of sets of one or more measurement-related signals being associated with a respective set of resource elements and a respective index.

7. The method of claim 1, wherein the second indication indicates uplink resources for sending the at least one measurement report.

8. The method of claim 7, wherein the uplink resources correspond to one or more physical uplink control channel or physical uplink shared channel resources.

9. The method of claim 1, wherein the second indication indicates a type of measurement to be reported.

10. The method of claim 9, wherein the type of measurement corresponds to a reference signal received power (RSRP) measurement.

11. A wireless transmit/receive unit (WTRU) comprising a processor and memory, the processor and memory configured to:
    receive a radio resource control (RRC) message, the RRC message comprising configuration information indicating a set of one or more measurement-related signals, the set of one or more measurement-related signals being associated with a set of resource elements;
    receive a first indication, the first indication indicating that the set of one or more measurement-related signals associated with the set of resource elements has been activated;
    receive a second indication, the second indication indicating a request to report one or more measurements associated with the set of one or more measurement-related signals associated with the set of resource elements;
    send at least one measurement report based on receiving the second indication, the at least one measurement report comprising one or more measurement values determined based on one or more measurements of the set of one or more measurement-related signals associated with the set of resource elements; and
    receive a third indication, the third indication indicating that the set of one or more measurement-related signals associated with the set of resource elements has been deactivated.

12. The WTRU of claim 11, wherein the first indication comprises an index corresponding to the set of one or more measurement-related signals associated with the set of resource elements.

13. The WTRU of claim 12, wherein the index indicated in the configuration information comprised in the RRC message.

14. The WTRU of claim 11, wherein the set of one or more measurement-related signals comprise a first set of one or more non-zero power channel state information reference signals (CSI-RSs).

15. The WTRU of claim 11, wherein the set of one or more measurement-related signals comprise a first set of one or more channel state information interference measurement (CSI-IM) signals.

16. The WTRU of claim 11, wherein the configuration information indicates a plurality of sets of one or more measurement-related signals, each of the plurality of sets of one or more measurement-related signals being associated with a respective set of resource elements and a respective index.

17. The WTRU of claim 11, wherein the second indication indicates uplink resources for sending the at least one measurement report.

18. The WTRU of claim 17, wherein the uplink resources correspond to one or more physical uplink control channel or physical uplink shared channel resources.

19. The WTRU of claim 11, wherein the second indication indicates that a reference signal received power (RSRP) measurement is to be reported.

20. A base station comprising a processor and memory, the processor and memory configured to:

send a radio resource control (RRC) message to a wireless transmit/receive unit (WTRU), the RRC message comprising configuration information indicating a set of one or more measurement-related signals, the set of one or more measurement-related signals being associated with a set of resource elements;

send a first indication, the first indication indicating that the set of one or more measurement-related signals associated with the set of resource elements has been activated;

send a second indication, the second indication indicating a request to the WTRU to report one or more measurements associated with the first set of one or more measurement-related signals associated with the set of resource elements;

receive at least one measurement report based on sending the second indication, the at least one measurement report comprising one or more measurement values associated with the set of one or more measurement-related signals associated with the set of resource elements; and send a third indication, the third indication indicating that the set of one or more measurement-related signals associated with the set of resource elements has been de-activated.

* * * * *

UNITED STATES PATENT AND TRADEMARK OFFICE
CERTIFICATE OF CORRECTION

PATENT NO. : 12,294,885 B2
APPLICATION NO. : 18/507607
DATED : May 6, 2025
INVENTOR(S) : Pouriya Sadeghi et al.

Page 1 of 1

It is certified that error appears in the above-identified patent and that said Letters Patent is hereby corrected as shown below:

In the Claims

In Claim 20: Column 46, Line 13, delete "first".

Signed and Sealed this
Third Day of June, 2025

Coke Morgan Stewart
*Acting Director of the United States Patent and Trademark Office*